United States Patent [19]

Knight et al.

[11] Patent Number: 4,492,903

[45] Date of Patent: * Jan. 8, 1985

[54] OPTIMUM EFFICIENCY BRUSHLESS DC MOTOR

[75] Inventors: John H. Knight, Kettering; Milton S. Isaacson, Dayton, both of Ohio

[73] Assignee: Nu-Tech Industries, Inc., Dayton, Ohio

[ * ] Notice: The portion of the term of this patent subsequent to May 31, 1994 has been disclaimed.

[21] Appl. No.: 213,929

[22] Filed: Dec. 8, 1980

Related U.S. Application Data

[60] Division of Ser. No. 799,730, May 23, 1977, Pat. No. 4,238,717, which is a continuation-in-part of Ser. No. 561,537, Mar. 24, 1975, Pat. No. 4,027,215.

[51] Int. Cl.³ .............................................. H02D 5/16
[52] U.S. Cl. ..................................... 318/341; 318/254; 318/138; 318/432; 318/696; 318/373; 318/703
[58] Field of Search ............... 318/254, 138, 166, 165, 318/130, 168, 373, 696, 448, 432, 341, 703, 718, 744, 763, 764, 307

[56] References Cited

U.S. PATENT DOCUMENTS

| | | | |
|---|---|---|---|
| 3,328,656 | 6/1967 | Thompson | 318/696 |
| 3,345,547 | 10/1967 | Dunne | 318/696 |
| 3,435,314 | 3/1969 | Bradley et al. | 318/685 |
| 3,551,766 | 1/1970 | Stemmler | 318/723 |
| 3,611,081 | 10/1971 | Watson | 318/138 |
| 3,636,429 | 1/1972 | Jakubowski et al. | 318/696 |
| 3,783,357 | 1/1974 | Ichiyanage | 318/138 |
| 4,002,958 | 1/1977 | Akamatsu | 318/811 |
| 4,027,215 | 5/1977 | Knight et al. | 318/432 |
| 4,039,919 | 8/1977 | Suzaki et al. | 318/696 |

FOREIGN PATENT DOCUMENTS 2529524 6/1975 Fed. Rep. of Germany .
7519490 6/1975 France .
50-80763 6/1975 Japan .

OTHER PUBLICATIONS

"An Electronically Operated and Controlled Brushless DC Motor" Nu-Tech Industries, 1-75.

Primary Examiner—David Smith, Jr.
Attorney, Agent, or Firm—Wood, Herron & Evans

[57] ABSTRACT

A machine includes a rotor with a magnetic field produced therein that is fixedly oriented with respect to the rotor. The rotor is rotatably mounted within a stator which has a plurality of windings. Means are provided for applying voltage pulses to the stator windings. When voltage pulses are applied to the stator windings, there is a torque due to the interaction of a magnetic field produced in the stator windings and the rotor magnetic field that causes the rotor to rotate. A control system responds to voltage induced across unpowered stator windings by the rotating rotor magnetic field and controls application of the voltage pulses to the stator windings. The voltage pulse sequence, frequency, and duration are determined by the control system. The control system may also adjust the voltage pulse amplitude. The voltage pulses are applied to the stator windings in such a way that the machine operates at optimum efficiency and at a selectable speed over a wide range of loads and/or line voltages. The control system includes means for plugging the stator windings in the event that the selectable speed is exceeded. This assures synchronous operation of the machine at the selectable speed. In the case of a machine with three or more phases, the control system additionally includes means for distinguishing between voltage induced across unpowered stator windings by the rotating rotor magnetic field and voltage due to switching transients and transformer action among the stator windings.

9 Claims, 19 Drawing Figures

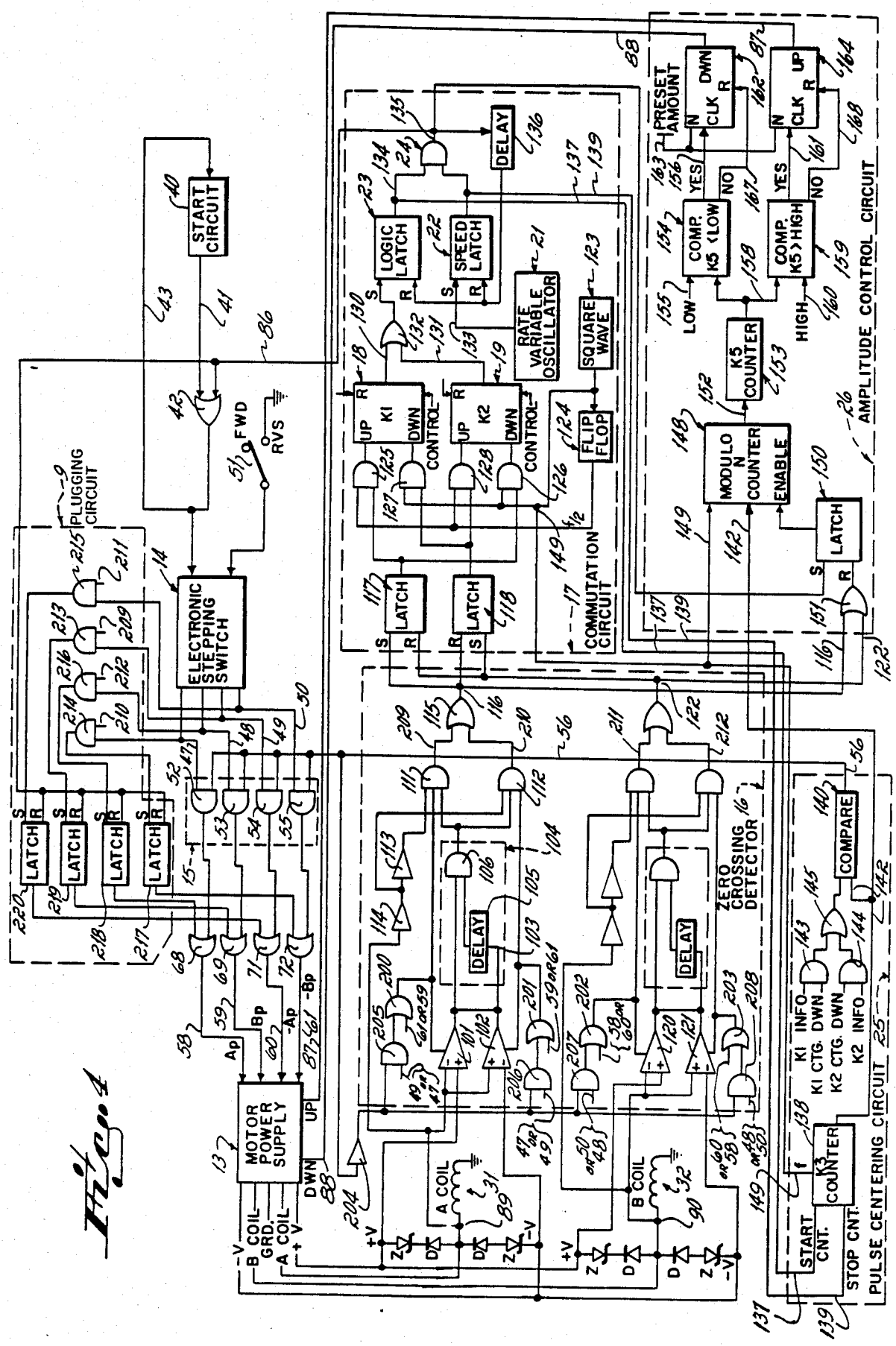

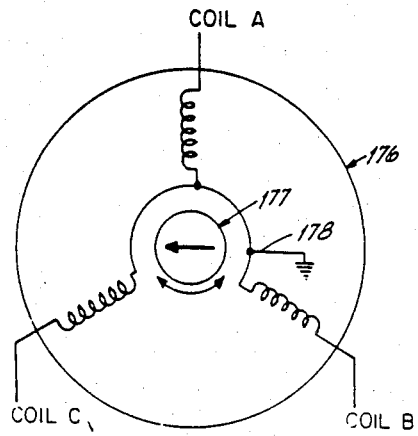
Fig. 12
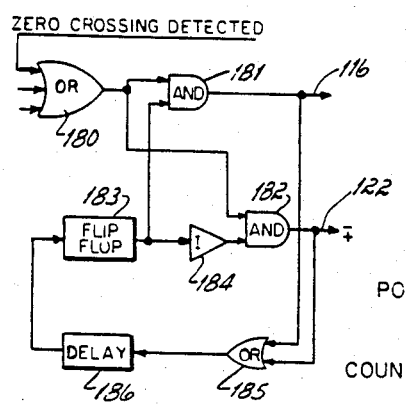
Fig. 14
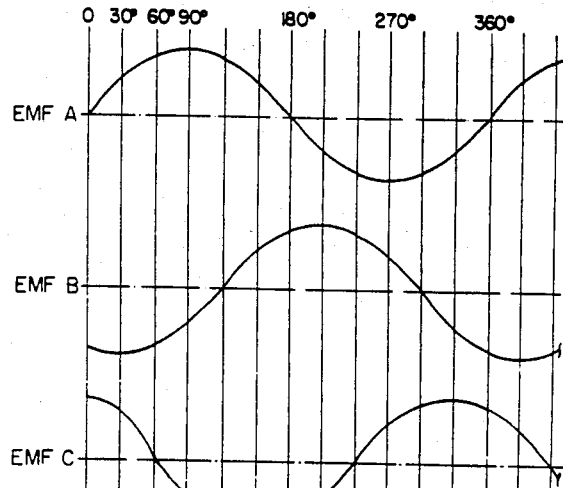
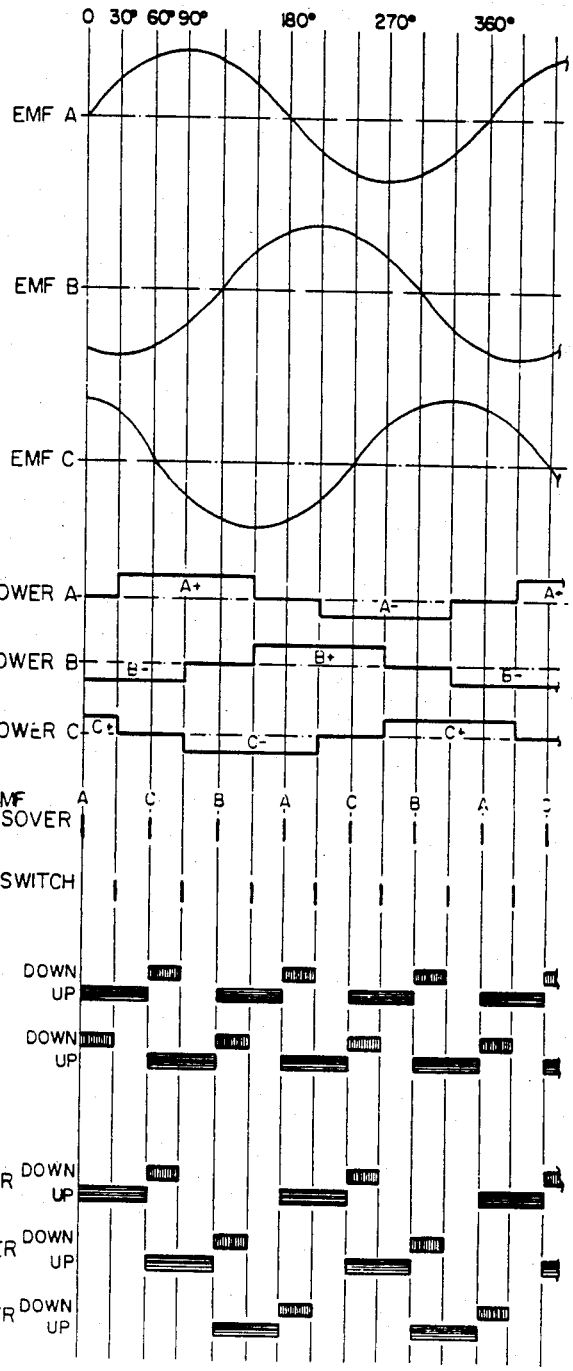
Fig. 13

OPTIMUM EFFICIENCY BRUSHLESS DC MOTOR

CROSS-REFERENCES TO RELATED APPLICATIONS

This application is a divisional of application Ser. No. 799,730, filed May 23, 1977, now U.S. Pat. No. 4,238,717, which application was a continuation-in-part of an application of John H. Knight and Milton S. Isaacson entitled ROTARY MACHINE, Ser. No. 561,537, filed Mar. 24, 1975, now U.S. Pat. No. 4,027,215, which is in turn a continuation-in-part of an application of John H. Knight and Milton S. Isaacson entitled ROTARY MACHINE, Ser. No. 484,563, filed July 1, 1974, now abandoned.

BACKGROUND OF THE INVENTION

This invention relates to the field of speed controls for rotary machines and, particularly, to a speed control which utilizes plugging to assure stability of a rotary machine at a selectable synchronous speed over a wide range of loads and line voltages. Additionally, this invention relates to a control system for high speed rotary machines with three or more phases, and, particularly, to a control system which responds to voltage induced across unpowered stator windings by a rotating rotor magnetic field to control application of voltage pulses to the stator windings.

Rotary machines have generally been classified as either DC or AC machines. Both types of machines include means for generating at least two different magnetic fields, one field being produced in a rotor and the other field being produced in a stator. When these fields are not aligned with each other, a torque is established which brings about a rotary movement of the rotor. As the rotor turns, the orientation of the rotor field with respect to the stator field changes. As the field orientation changes, the magnitude of the torque on the rotor also changes so that the machine must include some means for reorienting one magnetic field with respect to the other so as to maintain the torque on the rotor near a maximum in order to sustain efficient operation.

In DC machines, the rotor armature normally has a plurality of windings wound thereon which are connected to an external power source through brushes and a mechanical commutator. The commutator causes voltage to be applied selectively to the armature windings so that the magnetic field produced in the rotor on the average will be aligned at a 90° angle to the stator magnetic field produced in fixed stator windings or by a permanent magnet stator. Because the angle between the armature field and the stator field for a DC machine is on the average 90°, the DC machine is generally efficient, and torque on the rotor is maximum. However, the DC machine does have a drawback over most AC machines. When the DC machine is loaded by an external device connected to the rotor, the angular velocity of the rotor decreases in a somewhat linear fashion as the load increases. Consequently, DC machinery is not suitable for use in applications where constant speed is required and the load and/or line voltage varies unless some form of auxiliary speed controller is utilized.

AC synchronous machines, on the other hand, are designed to utilize an alternating current power source to power and synchronize the machine. The fixed frequency of the AC power source is automatically operative to cause rotation at a fixed angular velocity. When the synchronous machine is more heavily loaded, the machine is operative to cause the torque angle, the angle between the rotor field and the stator field, to come ever closer to a 90° angle. In this manner, the torque on the rotor increases as the load on the machine increases. Consequently, an AC synchronous machine is able to maintain a constant speed even as the load varies. The problem with AC synchronous machines is that such machines do not operate at optimum efficiency for all loads. Indeed, the AC synchronous machine is most efficient when it is heavily loaded because the torque angle approaches 90°. When the AC synchronous machine is less heavily loaded, the torque angle is less than 90°, thus reducing the machine efficiency.

In addition, AC synchronous machines do not have the ability to readily adjust speed and are well known to have a tendency to be unstable. The torque angle of the synchronous machine is determined by the load. If the load changes, the torque angle will change to accommodate the new load. As the AC synchronous machine changes toward a new torque angle, it will overshoot and then come back toward the new torque angle so as to oscillate into the new torque angle. An AC synchronous machine, however, depending on the amount and rate of load change, can oscillate so badly that it will drop out of synchronism unless means such as damper windings are provided for reducing oscillation.

The rotary machine which is described in Ser. No. 561,537 filed Mar. 24, 1975 incorporate the desirable features of both the DC commutator machine and the AC synchronous machine. Specifically, the rotary machine operates efficiently as a DC commutator machine and also operates at a selectable sychronous speed over a wide range of loads and/or line voltages as an AC synchronous machine. Moreover, the rotary machine does not have the drawbacks of other DC brushless motors or transducerless machines since operation of the rotary machine control system is substantially independent of machine size.

Although the rotary machine which is described in aforementioned Ser. No. 561,537, in contradistinction to an AC synchronous machine, operates as a DC commutator machine because it operates at a constant torque angle, due to the fact that the rotary machine is preferably maintained at a selectable speed if the load changes, it has a tendency to become unstable as in the case of an AC synchronous machine. That is, if the load changes, the voltage pulse amplitude and/or width will change to accommodate the new load. If the load changes rapidly by a substantial amount, however, the voltage pulse amplitude and/or width that is necessary to maintain the rotary machine at the selectable speed can be overshot, then undershot, and then overshot again, etc. so that the rotary machine oscillates and possibly drops out of synchronism.

In the preferred form of the rotary machine in aforementioned Ser. No. 561,537, the control system responds to voltage induced across unpowered stator windings by the rotating rotor magnetic field to control the application of voltage pulses to the stator windings. When such a machine with three or more phases is operated at high speed, however, transformer action among the stator windings which occurs at times when voltage pulses are applied to and removed from stator windings affects the voltage across unpowered stator windings. This in turn can cause improper control of the application of voltage pulses to the stator windings.

OBJECTIVES OF THE INVENTION

An objective of the invention is to provide means for synchronizing a machine upon changes in load or line voltage to thereby maintain synchronous operation at a selectable speed.

An additional objective of the invention is to provide means for synchronizing the machine at a selectable speed during start-up and/or for synchronizing the machine at a different selectable speed during operation.

Another objective of the invention is to provide means for preventing unstable oscillation of the machine speed to thereby assure synchronous operation of the machine at a selectable speed.

It is also an objective of the invention to provide a machine which is stable and which runs as efficiently as a DC commutator machine, has the ability to be operated synchronously over a wide range of machine torques, and has a design which is substantially independent of machine size.

It is another objective of the invention to provide a machine which runs synchronously and efficiently at a selectable speed while the load or line voltage varies by providing means for varying the duration of voltage pulses applied to the stator windings to compensate for small line voltage and/or load variations and by providing means for altering the voltage pulse sequence and/or for adjusting the voltage pulse amplitude to compensate for large line voltage and/or load variations.

It is a further objective of the invention to provide a machine which responds to induced voltage in unpowered stator windings to control voltage pulses applied to the stator windings so that the machine runs as a controlled DC machine at a selectable speed over a wide range of machine torques.

It is another objective of the invention to provide a machine which runs efficiently and synchronously at a selectable speed by providing means including a pulse generator for producing pulses derived from the zero crossings of the induced voltage in conjunction with a reference oscillator for detecting deviation from the synchronous speed and correcting the machine operation to compensate for the deviation.

It is yet another objective of the invention to provide a high speed machine with three or more phases which runs efficiently and synchronously at a selectable speed by providing means to utilize the zero crossings of induced voltage in unpowered stator windings and ignore the zero crossings of voltage across stator windings associated with power switching and transformer action among the stator windings to thereby provide signals indicative of the rotor position for controlling the switching of power from one stator winding to another.

SUMMARY OF THE INVENTION

One aspect of the invention is predicated on the concept of "plugging" when a selectable synchronous speed is exceeded, that is, changing the sequence in which voltage pulses are applied to the stator windings of a motor when the motor is overspeed. By changing the sequence in which voltage pulses are applied to the stator windings, the speed of the rotor is retarded so as to synchronize the motor speed at the selectable synchronous speed. The use of plugging synchronizes the motor speed upon changes in load or line voltage, during start-up, or when the selectable synchronous speed is reset during operation. Plugging prevents unstable oscillation of the motor speed and assures synchronous operation.

A further aspect of the invention is predicated on the concept of distinguishing between voltage induced across unpowered stator windings by the rotating rotor magnetic field and voltage due to switching transients and transformer action among the stator windings. This permits utilization of the induced voltage to determine the precise time when voltage pulses should be applied to the stator windings so as to maintain constancy of average torque angle for optimum efficiency and also to maintain constant speed over a wide range of motor torques.

In a preferred embodiment of the invention, a rotor is provided with a magnetic field produced therein that is fixedly oriented with respect to the rotor. The rotor freely rotates within a stator located around the rotor, the stator having a plurality of windings arranged so that voltage applied to the stator windings produces a magnetic field which interacts with the rotor magnetic field to produce a torque on the rotor causing rotation thereof. As the rotor turns, voltage is induced across the stator windings. A control network responds to the voltage induced in unpowered stator windings, and, particularly, to the zero crossings of the induced voltage, to activate a power network which normally produces voltage pulses that are applied to the stator windings at a predetermined frequency in a predetermined sequence. These voltage pulses cause the rotor to rotate at the selected speed in a predetermined direction of rotation. The voltage pulses are produced at times when the torque angle is on the average a selectable value, the selectable value being 90° when maximum efficiency is desired.

If the rotor speed increases, a control network senses this condition and causes the duration of the voltage pulses applied to the stator windings to be reduced, thereby causing the rotor speed to decrease. If the rotor speed decreases, the voltage pulses applied to the stator windings are widened by the control network, thus increasing rotor speed. The voltage pulse narrowing and widening compensates for relatively small speed variations caused by changes in load and/or line voltage.

For large speed increases, the control network "plugs", that is, alters the normal sequence of the voltage pulses applied to the stator windings. The control network may also decrease the voltage pulse amplitude in the event of a large increase in speed and/or increase the voltage pulse amplitude in the event or a large decrease in speed. The decrease or increase of voltage pulse amplitude besides causing the rotor to slow down or speed up also allows the pulse width to remain within selected limits. These voltage pulse sequence and amplitude changes maintain synchronous operation when large machine torque variations occur.

In the case of a motor with three or more phases, the control network includes means for distinguishing between voltage induced across unpowered stator windings by the rotating rotor magnetic field and voltage due to switching transients and transformer action among the stator windings. Slope sensors are preferably included to cause the control network to respond only to the induced voltage and, particularly, to zero crossings of the induced voltage. Use of the slope sensors facilitates detection of the zero crossings of the induced voltage no matter what the motor speed.

DESCRIPTION OF THE DRAWING

The foregoing and other objectives, features, and advantages of this invention will become more clear from the following detailed description of a preferred embodiment therefor taken in connection with the drawing in which:

FIG. 4 is a schematic block diagram which includes the speed control of the invention;

FIG. 12 is a schematic diagram of a three phase/four wire machine;

FIG. 13 shows a timing diagram for a three phase/four wire machine while the machine is operating without pulse width control;

FIG. 14 shows a schematic diagram of a circuit for accepting positive pulses from a plurality of zero crossing detectors and utilizing these pulses to produce control pulses for the up/down counters of a commutation circuit;

GENERAL DESCRIPTION

Figure 4A:
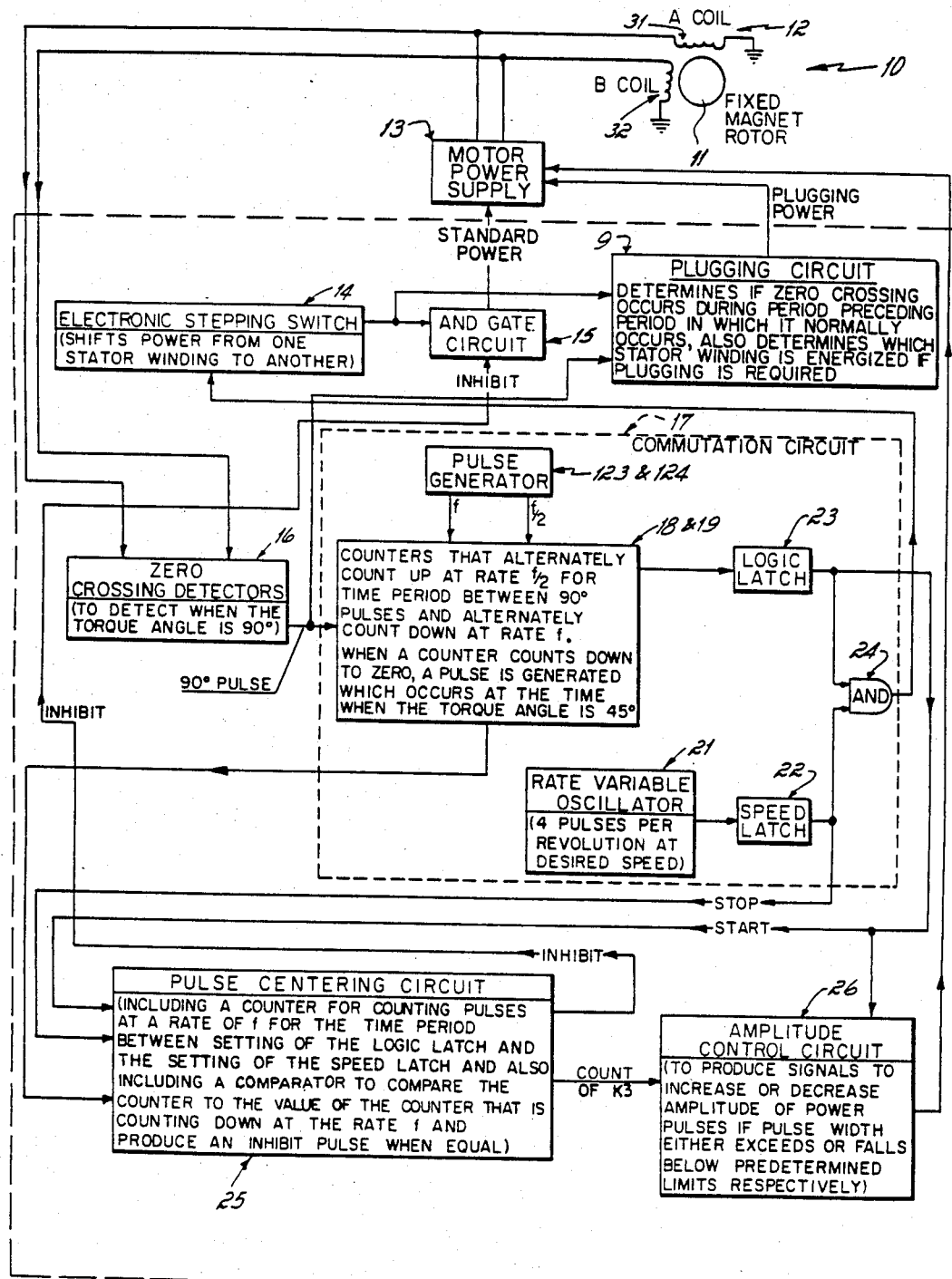
FIG. 4a is another schematic block diagram showing the function of each major element in FIG. 4.

As shown in FIG. 4a, a motor 10 includes a fixed magnet rotor 11 and a stator 12 having two windings shown as the A coil and B coil. A motor power supply 13 is connected to the A coil and B coil for providing voltage pulses to the A coil and B coil. A stepping switch 14 is connected to the motor power supply 13 via a gate circuit 15 to control which stator winding receives electrical power at any given moment of time. Normally, the inhibit signal to the gate circuit 15 is not present so that the position of stepping switch 14 indicates to the motor power supply 13 the stator winding to which voltage is applied.

When the rotor 11 of the motor is rotating, the magnetic field of the rotor induces voltage across the stator windings. Zero crossing detectors 16 are connected to the stator windings to detect when the induced voltage in either stator winding passes through zero volts. When this occurs, a position pulse is generated at a time when the rotor is at a predetermined position which, for the two stator winding machine shown, corresponds to the time when the torque angle is 90°. In other words, the position pulse is generated at a time when the magnetic field of the rotor is arranged at a 90° angle to the magnetic field generated by whichever stator winding is receiving power. Since the position pulse occurs at a point in time when the torque angle is 90° for the machine shown, the invention contemplates power pulse symmetry about this time so as to maximize efficiency.

The position pulses generated at the output of the zero crossing detectors 16 are input to a commutation circuit 17 and are utilized by two counters 18 and 19 that alternately count up at a rate of f/2 for the time period between successive position pulses and alternately count down at a rate of f. These counters, when they count down to zero, generate a borrow pulse or second position pulse at their output. Since the counters 18 and 19, when they are counting up, count for a period of time corresponding to rotation of the rotor of 90° for the two phase machine described, the borrow pulse or second position pulse is generated at a time after the counter starts counting down which corresponds to the time required for the rotor to rotate 45° after a position pulse occurs. As hereinafter mentioned, the borrow pulse or second position pulse occurs at a time at which power should be shifted from one stator winding to another assuming that power is applied to each stator winding for the period of time required to rotate the rotor 90° at a selected rotor speed.

The machine includes a rate variable oscillator 21 producing four pulses evenly spaced in time during the time period required for the rotor to make one complete revolution at the desired speed. These pulses set a speed latch 22.

The borrow pulses or second position pulses generated by the counters 18 and 19 are utilized to set a logic latch 23. When the logic latch 23 and the speed latch 22 are set, an AND gate 24 connected to the outputs of the logic latch and the speed latch is operative to generate a signal at its output for stepping the stepping switch 14 so as to remove power from one stator winding and apply it to another stator winding in accordance with the desired sequence so as to maintain rotation of the rotor.

In normal operation of the machine, the logic latch 23 will be set at a time prior to the setting of the speed latch 22. A pulse centering circuit 25 is provided to respond to the setting of the logic latch to start a counter for counting pulses at a rate of f for the time period between the setting of the logic latch and the setting of the speed latch. The number counted by this counter represents the amount of time by which a power pulse applied to a given stator winding of the machine is shortened at its leading edge by the circuitry previously described. The objective of the pulse centering circuitry is to shorten the trailing edge of the same power pulse so as to center the pulse about a time when the average torque angle is a predetermined value which, for maximum efficiency, corresponds to an average torque angle of 90°. The pulse centering circuit compares the number in its counter continually with the counter which is counting down at a rate of f. When these two counters are equal, a comparator in the pulse centering circuit generates an inhibit signal which is operative to close the gate circuit thereby causing the power supply to remove power from the powered stator windings. As such, the trailing edge of a power pulse applied to a stator winding is shortened by the same period of time that the leading edge of the same power pulse was delayed.

It will be readily recognized by those of skill in the art that the circuitry heretofore described in the general description is operative to control the operation of the machine so as to maintain a constant selectable speed determined by the rate variable oscillator 21 even while the load torque on the rotor varies and also to maintain operation at an optimum efficiency which preferably is maximized. In other words, by widening or narrowing power pulses applied to the motor stator windings, the speed of the rotor can be maintained at a constant selectable value even while the load torque varies. Additionally, the power pulses applied to the motor stator windings are applied symmetrically so that the average torque angle will be a selectable value which is preferably 90° and, therefore, the motor operates at a maximum efficiency.

The count of the counter in the pulse centering circuit is correlated to the pulse width of power pulses applied by the power supply to the stator windings. When the count becomes relatively small, the pulse width is relatively large and, conversely, when the count is large, the pulse width is relatively small. As the load torque on the rotor changes, the width of the power pulses applied to the stator windings will also change so as to maintain synchronous speed. Generally, as the load torque increases, the pulse width will increase and, conversely, as the load torque decreases, the pulse width will decrease. It has been discovered, however, that pulse width control for machines of the type generally described above is operative to adjust the machine operating conditions sufficiently to compensate for relatively small load torque variations. However, for large load torque and line voltage variations, pulse width control is not effective for maintaining synchronous operation.

In order to maintain synchronous operation when large load torque variations occur, an amplitude control circuit 26 is provided which responds to the pulse centering circuit 25. If the pulse width exceeds a predetermined upper limit, the amplitude control circuit 26 generates a signal at its output which is transmitted to the power supply 13 to increase the amplitude of power pulses applied to the stator windings. On the other hand, if the pulse width falls below a predetermined minimum value, the amplitude control circuit 26 transmits a signal to the power supply 13 to decrease the amplitude of power pulses applied to the stator windings. In order to maintain synchronous operation when large load and/or line voltage variations occur which increase the speed of the rotor above the selectable speed established by the rate variable oscillator 21, the plugging circuit 9 synchronizes the motor 10 to the selectable speed. The plugging circuit 9 also brings the motor 10 into synchronism during start-up, speed increase or decrease due to manual reset of the rate variable oscillator 21, etc. and thereafter maintains synchronism at a constant selectable speed.

The plugging circuit 9 is responsive to the position pulses from the zero crossing detectors 16 and to the position of the stepping switch 14 to sense a position pulse that occurs prematurely thereby indicating an overspeed condition. If a position pulse occurs prematurely, the plugging circuit 9 causes the motor power supply 13 to apply a power pulse to a stator winding to plug the stator winding until such time as the commutation circuit 17 causes the stepping switch 14 to change position. Consequently, the rotor speed is momentarily retarded so as to synchronize the motor 10 at the selectable speed.

The use of plugging provides a highly responsive method to correct an overspeed condition. The plugging method of overspeed correction prevents oscillation of the motor speed and thereby assures synchronous operation of the motor 10 at the preset speed. In any event, the variation of the pulse amplitude to the stator windings is operative with the pulse widening and shortening and plugging circuitry to maintain synchronous operation even when a large load torque or line voltage variation occurs.

It will become more clear later than the principles of the invention as described generally above are equally applicable to machines having three or more stator windings or phases. Indeed, the principles of the invention are applicable to machines of any size having any number of stator windings or phases.

DETAILED DESCRIPTION

Figure 1:
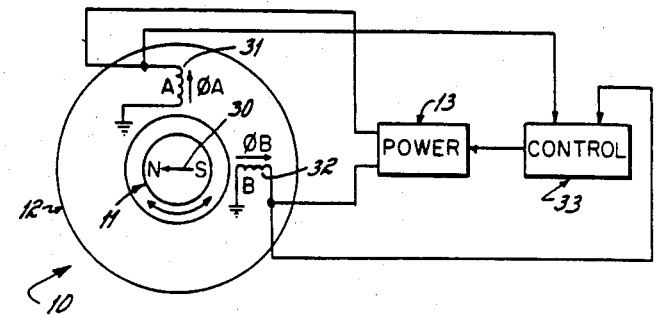
FIG. 1 is a schematic diagram of a two phase machine connected to power circuitry and control circuitry.

Referring now to FIG. 1, the motor 10 of this invention is characterized by having a rotor, shown diagrammatically as 11, and a stator, shown diagrammatically as 12. The rotor 11 is of the stationary field type and has some means associated therewith for producing a magnetic field or fields therein with a fixed direction and orientation with respect to the rotor 11, as indicated generally by the arrow 30. The rotor field direction is generally aligned in a direction perpendicular to the axis of rotation of the rotor 11 which, for the machine shown diagrammatically in FIG. 1, is perpendicular to the sheet. In some machines, however, the rotor field may be different from that shown in FIG. 1 as, for example, in machines having multiple rotors or other machines where the rotor field is not aligned perpendicular to the axis of rotor rotation.

The rotor field producing means may comprise a permanent magnet mounted in the rotor itself. Alternatively, the rotor field may be generated by current carrying windings on the rotor which produce the desired rotor field fixedly oriented with respect to the rotor when current flows therethrough. The rotor windings are electrically connected by a slip ring and some form of brush connection or the like to an external source of electrical power. A further alternative means of generating the magnetic field in the rotor 11 is to externally induce the magnetic field by any suitable means.

As with most machines, the stator 12 includes a plurality of stator windings shown diagrammatically at 31 and 32 which were referred to above as the A coil and B coil, respectively. Each stator winding 31 and 32 comprises a plurality of turns of electrically conductive insulated wire wound in a manner well known in the electrical machine art. When current flows through either of the stator windings 31 or 32, a magnetic field is produced thereby having a direction which is also perpendicular to the axis of rotation of the rotor 11. So long as the direction of the field in either stator winding 31 or 32 is not the same as the direction of the magnetic field of the rotor 11, a torque is exerted on the freely rotatable rotor 11 that causes the rotor 11 to turn about its axis of rotation.

The torque on the rotor 11 is a function of the torque angle, that is, the physical angle between the direction of the stator field and the direction of the rotor field. When the stator field is constant and the torque angle is 90°, the force on the rotor is maximum. When the torque angle is 0°, the force is zero. For the machine in FIG. 1, if a voltage is applied to the stator winding 31 so as to produce a magnetic field shown generally by the arrow labeled ∅A, a force will be exerted on the rotor 11 to cause it to rotate in a clockwise direction. As the rotor 11 rotates in the clockwise direction from the position shown, however, the force exerted on the rotor 11 becomes smaller and smaller as the rotor 11 rotates toward a position where the rotor field becomes aligned with the stator field. The power must be shifted to winding 32 in order for rotation to be continued. As such, some form of field commutation is necessary in order to sustain rotary motion of the rotor 11.

The stator field commutation is accomplished by sequentially controlling the application of voltage to the stator windings 31 and 32. A control circuit, schematically shown at 33 in FIG. 1, responds to the voltage induced in the stator windings 31 and 32 by the rotating rotor to activate the power supply circuit 13 to produce power pulses which are applied to the stator windings 31 and 32 in a predetermined sequence at a predetermined selectable frequency to maintain rotation of the rotor 11 at a constant speed even when load torque changes.

Figure 2:
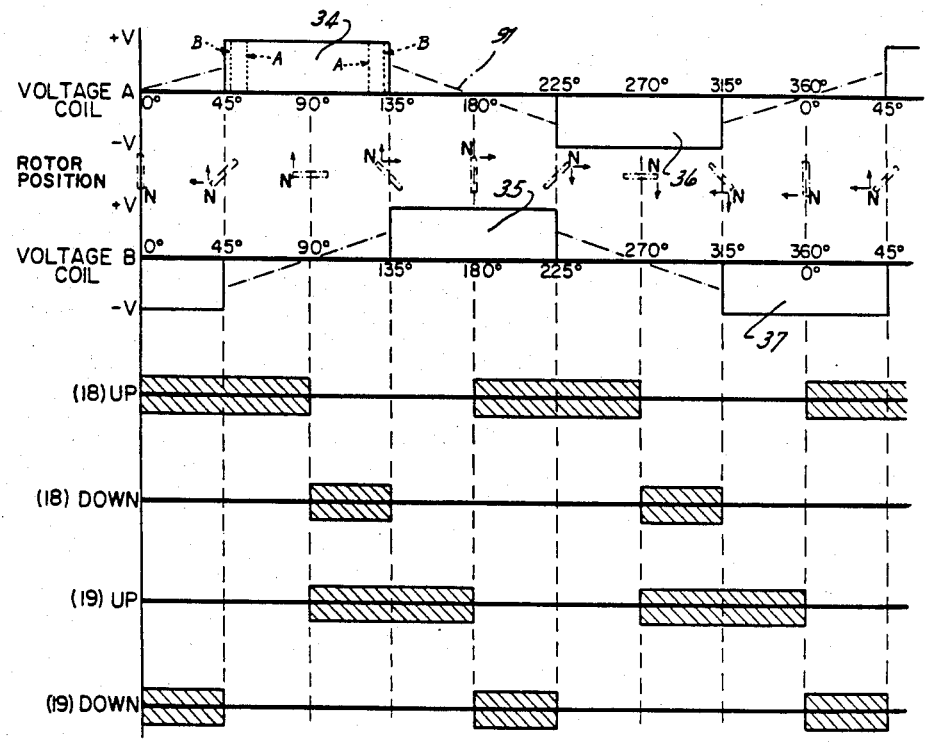
FIG. 2 is a timing chart showing voltages at different times during the normal operation of the machine in FIG. 1.

The desired predetermined sequence of power pulses for clockwise rotation of rotor 11 is shown diagrammatically in the upper half of FIG. 2. The rectangular areas 34, 35, 36, and 37 each represent the periods of time during which electrical pulses having a fixed amplitude are applied to a stator winding. The area 34, for example, corresponds to a period of time when a voltage of +V is applied to the stator winding 31. The area 36, on the other hand, corresponds to a period of time when a voltage of −V is applied to the same winding 31. Similarly, the rectangular area 35 corresponds to a period of time when a pulse having a voltage of +V is applied to the stator winding 32. The rectangular area 37 corresponds to the period of time when a pulse having a voltage of −V is applied to the stator winding 32.

The sequence and time at which pulses are applied to the stator windings 31 and 32, as shown in FIG. 2, is important in defining the direction of rotation and machine efficiency. To completely comprehend this statement, however, the basic machine operation must be understood. The rotor position shown in FIG. 1 is arbitrarily defined as the 90° position. When at this position, the direction of the rotor field indicated by the arrow 30 is disposed at a 90° angle to the direction of the field which is generated in the A coil 31 when voltage is applied thereto. Also, when the rotor is at the 90° position, the torque on the rotor 11 due to interaction of the rotor field and the field in the A coil is maximum. In order to maximize machine efficiency, the A coil and B coil must be energized for time periods during which the average torque angle is 90°. By way of example, power should be applied to the A coil during the period of time in which the rotor 11 rotates from a position where the rotor magnetic field direction 30 is oriented 45° counterclockwise to a position where the rotor field is 45° clockwise of that position shown for the rotor 11 in FIG. 1. As such, the average torque angle, when power is applied to the A coil for the period of time when the rotor rotates from a position 45° counterclockwise of that shown in FIG. 1 to a position 45° clockwise of the position shown in FIG. 1 is 90°, and the machine, when so operated, runs most efficiently. The pulse width of power pulses applied to stator windings can be varied but, so long as the leading edge and the trailing edge of the pulse are symmetrically timed, so that the pulse is centered at the 90° position, as shown, the average torque angle is 90°, and maximum efficiency is maintained.

Once the rotor 11 rotates 45° in the clockwise direction from the position shown in FIG. 1 to its 135° position as shown by the convention established in FIG. 2, the torque angle between the rotor field and the field in the A coil is 45°. At this position, the torque on the rotor 11 is significantly reduced from that at the 90° torque angle position. Consequently, it is desirable to turn off the power to the A coil and turn on the power to the B coil. The control circuit 33 accomplishes this switching function by first detecting the position of the rotor 11 with respect to the fixed stator in a manner which will be described in greater detail later and then issuing control signals to the power circuit 13 when the rotor 11 reaches the desired position for switching power from one winding to the other. Consequently, when the rotor reaches its 135° position, the power circuit 13 switches power from the A coil to the B coil. This change of power from the A coil to the B coil is shown in FIG. 2 at the 135° position whereat the power pulse 34 is turned off and the power pulse 35 is turned on.

The B coil remains powered for the period of time while the rotor moves from its 135° to its 225° position. After the rotor 11 has reached its 225° position, power must again be applied to the A coil, although the field generated thereby must be in a direction opposite to that generated by the pulse shown by the rectangular area 34 in FIG. 2 if rotary motion is to be sustained. This power pulse is shown generally by the rectangular area labeled 36 which produces a magnetic field in the A coil having a direction opposite to that generated by the pulse indicated by the rectangular area 34. The control circuit 33 assures that this pulse 36 is applied to the A coil for the period of time required for the rotor 11 to rotate from its 225° to its 315° position.

When the rotor 11 reaches its 315° position, the control circuit 33 removes power from the A coil and again applies power to the B coil as indicated generally by the rectangular area 37 in FIG. 2. Power is applied to the B coil for the period of time in which the rotor 11 rotates from its 315° position to its 45° position.

The control circuit 33 is operative to cause the power circuitry 13 to produce power pulses indicated by the rectangular areas 34, 35, 36, and 37 in the sequence shown. Thus, so long as the power pulse sequence is maintained, the rotor will rotate continuously. Further, as will become more clear later, by setting the maximum frequency of power pulse generation, the control circuit 33 can select the maximum speed of the motor.

Figure 3:
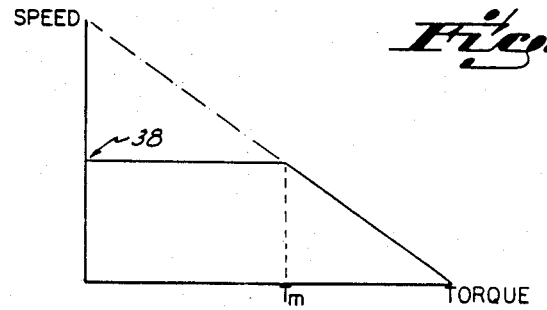
FIG. 3 is a speed-torque curve for the machine in FIG. 1.

The machine and its mode of operation as described above has a speed-torque characteristic curve like that shown in FIG. 3. The no load speed of the machine shown in FIG. 1 is indicated in FIG. 3 generally at 38. This no load speed is determined by the setting for the maximum permissible frequency of the power pulses applied to the stator windings 31 and 32. The higher the frequency of the power pulses, the higher the no load speed will be and vice versa.

When a load is applied, however, the rotary speed will not decrease below the no load speed shown generally at 38 unless the load applied is greater than Tm, the load at which the machine no longer operates synchronously. As the load increases above Tm, the speed of rotation drops just as a DC machine would operate when the load is increased.

The foregoing is a very general description of the operation of the machine shown diagrammatically in FIG. 1. The description indicates that power is applied to each stator winding for a period of time which corresponds to the time required for the rotor 11 to rotate 90°. In actuality, for the preferred machine shown in FIG. 1, power is applied to the stator windings 31 and 32 for a period of time which is less than that shown in FIG. 2 if the load torque on the machine is less than the maximum torque Tm as shown in FIG. 3.

In the preferred embodiment, the control circuit 33 is operative to apply power to the stator windings for varying periods of time, preferably centered about the 90° position depending on the load torque itself. For example, if the load torque increases, the rotor instantaneous velocity tends to decrease. The control circuit 33 senses this condition and responds by widening the power pulses applied to the stator windings. When the load torque falls, the instantaneous speed of the machine tends to rise so the control circuit 33 responds by reducing the power pulse width thereby maintaining an average 90° torque angle and constant speed operation.

The control circuit 33 also operates to maintain constant machine efficiency. This is accomplished by centering all power pulses, whether widened or shortened, at a time when the average torque angle is a constant value. For maximum efficiency, the power pulses are centered so that the average torque angle is 90°. For lower efficiency, the power pulses are centered so that the average torque angle is less than 90°.

While the control circuit 33 is capable of varying the pulse width over a wide range, it is desirable to prevent the pulse width from becoming too small because small pulse widths would give rise to very uneven motor torque generation during each revolution of the rotor. As such, it is desirable to arbitrarily select the minimum pulse width to be 65°, i.e., the time required for the rotor to rotate 65° at the selected speed as shown, for example, at A in FIG. 2. Also, for reasons that will become clearer later, it is desirable to arbitrarily select a maximum power pulse width of 85°, i.e., the time for the rotor to rotate 85° at the selected speed as shown at B in FIG. 2. The foregoing limits, however, have been arbitrarily selected and other limits may be utilized without substantially affecting the machine operation. When these limits are established, the degree to which pulse widening and shortening can compensate for varying load torques is reduced.

Since it is desirable to have the machine run at a constant speed even when there are wide variations in the load torque and also because pulse widening and shortening is able to compensate only for small load torque variations because the pulse width is not permitted to vary widely and has only a limited amount of power variation, the power circuitry 13 under the control of the control circuitry 33 is operative to vary the amplitude of the voltage of power pulses to stator windings to permit compensation for large variations in load torque. For example, should the control circuit 33 determine that the power pulse duration exceeds 85°, i.e., the time required for the rotor to turn 85° at the selected speed, this condition is detected by the control circuitry 33 which notifies the power circuitry 13. The power circuitry 13 responds to notification from the control circuitry 33 by incrementally increasing the voltage of the power pulse applied to the stator windings. This incremental increase in the voltage is operative to increase the generated torque to thereby compensate for the increased load torque on the machine. On the other hand, should the control circuit 33 determine that the power pulse duration is shorter than 65°, i.e., the time required for the rotor to turn 65° at the selected speed, the power circuitry 13 responds to the control circuitry 33 by incrementally reducing the voltage of the power pulse applied to the stator windings. Consequently, the generated torque is reduced to compensate for reduced load torque and the torque angle is maintained at an average of 90° at the selected constant speed. Since the power circuitry 13 is operable to incrementally vary the power pulse voltage applied to the stator windings 31 and 32 over a wide range of voltages, the generated torque of the motor can vary widely to compensate for large load torque variations while the motor operates at a selected constant speed. As such, the machine of the invention can operate at a constant selectable speed while the load torque varies over a wide range.

If an overspeed condition develops, such as might occur, as will be described, during start-up or a manual increase in the selectable speed or such as might be occasioned by a manual decrease in the selectable speed or sudden removal of a load or an overvoltage condition of the line voltage, the control circuit 33 causes the power circuit 13 to plug the stator windings so that the rotor rotation will be retarded and the motor 10 becomes synchronous at set speed. As will be made clear later, plugging provides a highly responsive method for correction of an overspeed condition and prevents oscillation of the motor speed which might otherwise result in loss of or inability to achieve synchronous operation. That is, plugging results in the motor 10 having very stable, synchronous operation.

FIG. 4 is a schematic block diagram according to the invention for the electrical circuit including the control circuitry 33 and the power circuitry 13, as described generally in FIGS. 1 and 4a, to control a machine of the type shown generally in FIG. 1.

The circuitry includes a start circuit 40, the electronic stepping switch 14, the motor power supply 13, the zero crossing detector 16, the commutation circuit 17, the pulse centering circuit 25, the voltage amplitude control circuit 26, and the plugging circuit 9. These elements of the circuit will be discussed in detail below in separate identified sections.

START CIRCUIT

The start circuit 40 is operative to start rotation of the machine in a desired direction when power is turned on. The start circuit 40 includes a pulse generator such as a single shot timer which produces a single pulse at its output 41. This pulse comprises one input to an OR gate 42. The pulse passes through the OR gate 42 to become an input to the electronic stepping switch 14 and also an input to the start circuit 40 itself via a reset wire 43. The pulse on the reset wire 43 resets the start circuit 40 by, for example, turning off the single shot timer. The timer then begins another timing cycle and produces another pulse after a predetermined period of time. In this manner, the start circuit 40 in combination with the OR gate 42 produces a series of pulses at the input of the electronic stepping switch 14. The pulse rate is selectable and may vary from machine to machine but typically is in the order of 100 pulses per second for small machines and lower in frequency for larger machines.

The start circuit may be modified so as to provide starting pulses at a varying frequency. By producing start pulses first at a low frequency and gradually increasing the pulse frequency, high inertia machines are more easily started than by using a start circuit which generates start pulses at one fixed frequency. A variable frequency oscillator may be utilized to produce pulses initially at a low rate and gradually increasing the pulse rate until the rotor speed is sufficient to induce a detectable voltage in the stator windings. Once normal circuit operation takes over, the start circuit is continually reset by the normal pulse circuitry.

Figure 15:
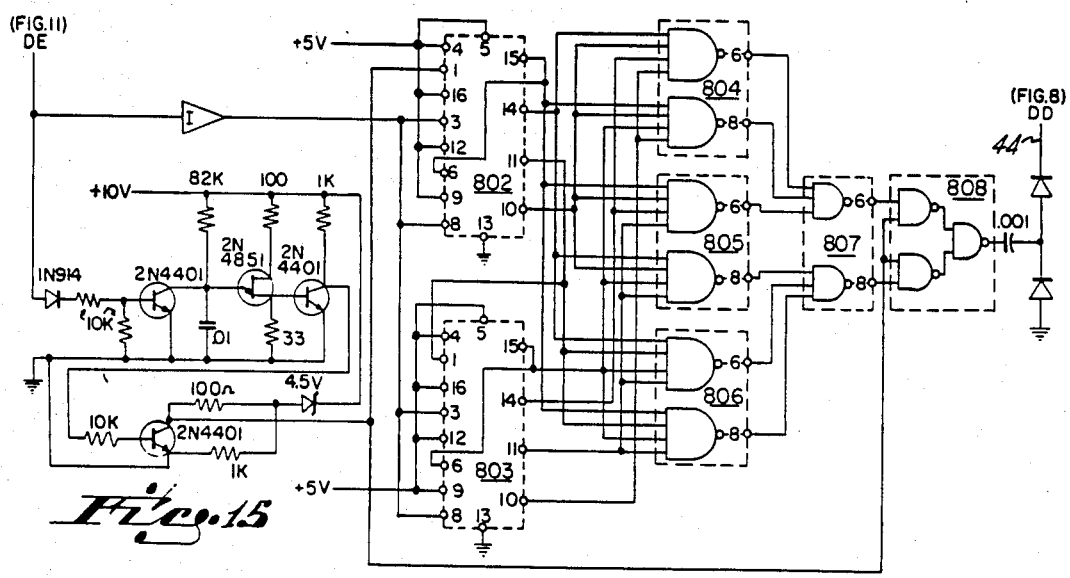
FIG. 15 is a circuit diagram for an alternative machine starting circuit especially useful for machines with a large inertia.
Figure 16:
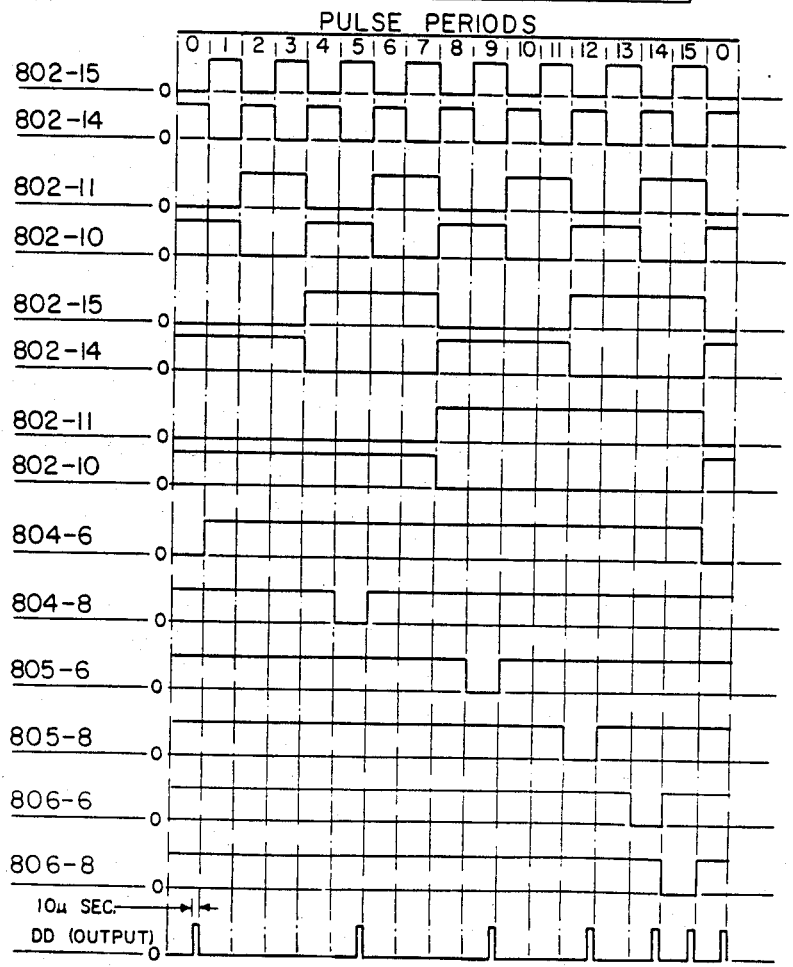
FIG. 16 is a timing chart for the circuit of FIG. 15.

An alternative starting circuit is shown in FIG. 15. This circuit produces a series of pulses at its output point 44 first at a slow rate and then at a successively increasing rate as shown by the timing chart of FIG. 16. After 16 time periods, the process is repeated.

Figure 8:
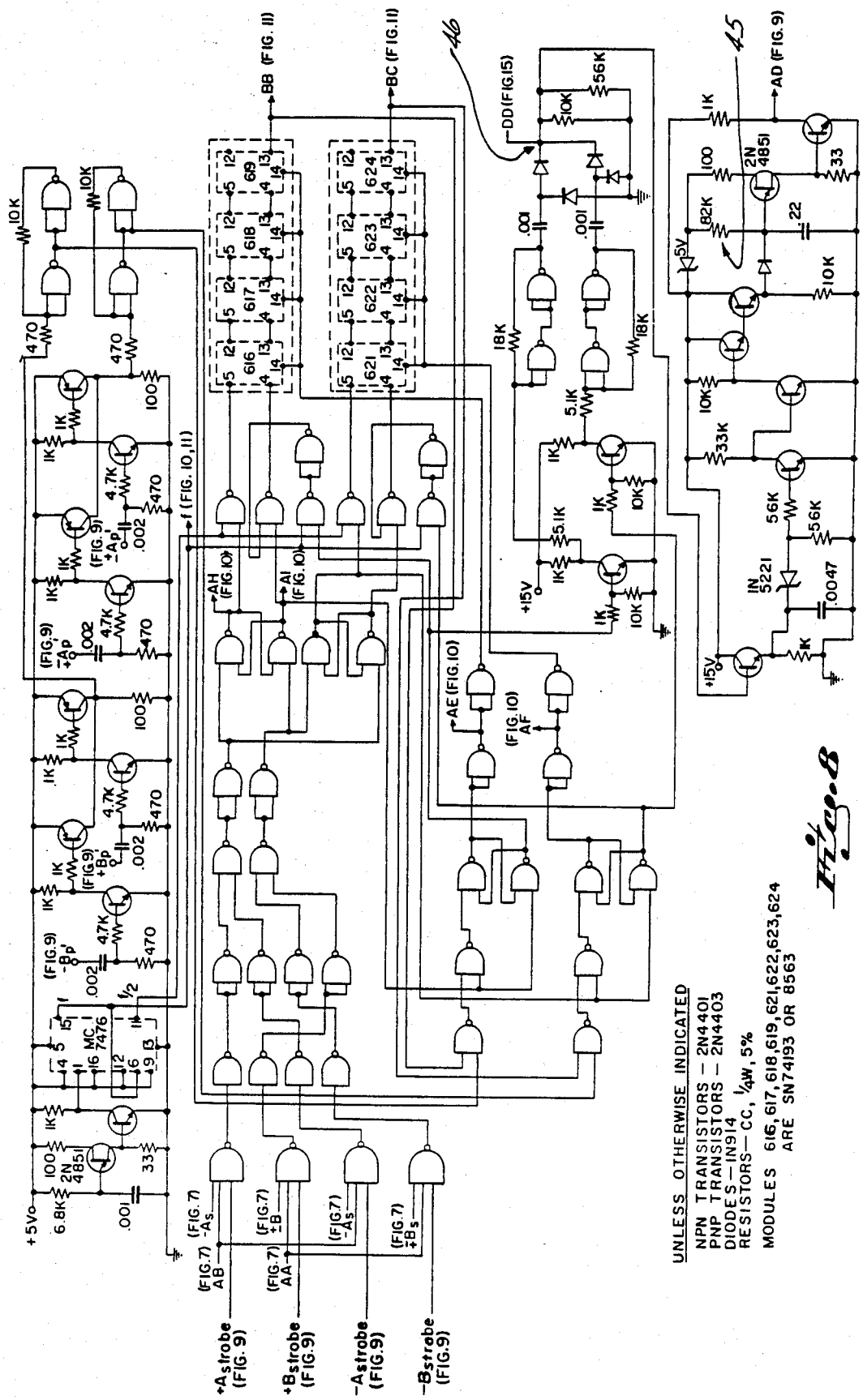
Figure 9:
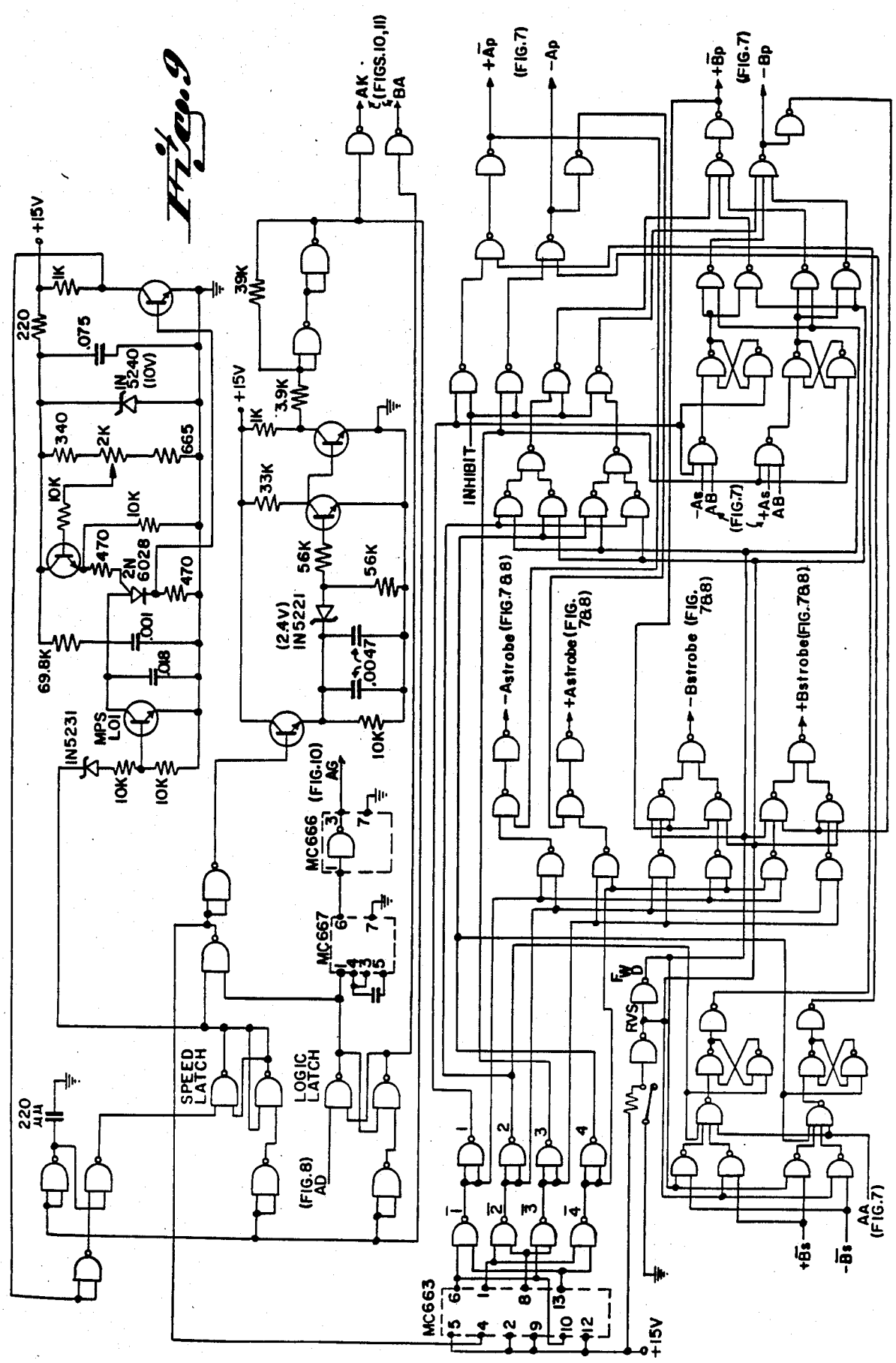
Figure 10:
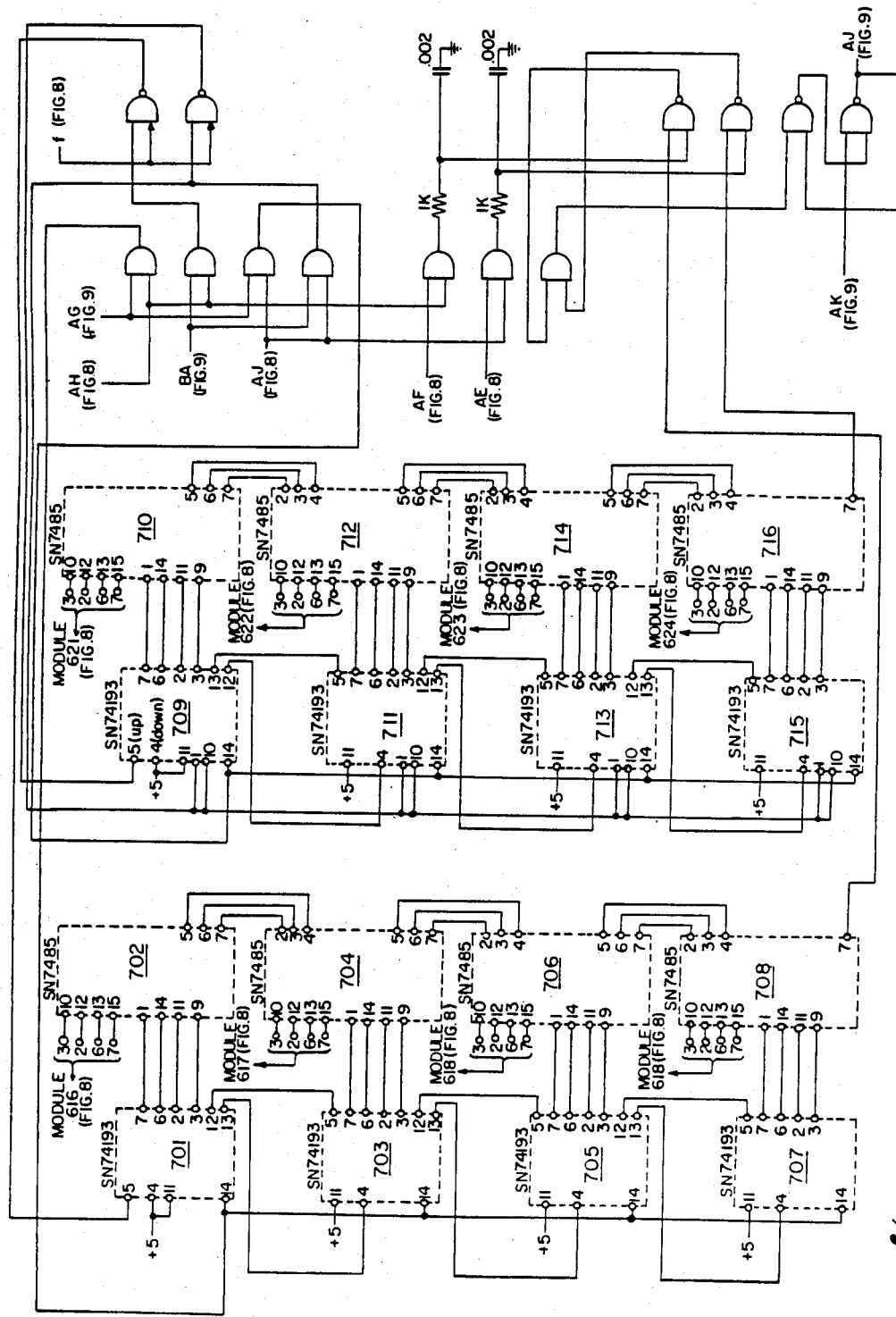

If the circuit of FIG. 15 is connected as shown to the actual system circuitry of FIG. 8, however, the 82K resistor 45 in the start circuit shown in FIG. 8 must be removed to prevent pulse generation but allow every pulse on DD to generate a pulse at AD. As such, the control circuitry is disabled until the up/down counters produce borrow pulses indicating the rotor is rotating fast enough for the control circuitry to take over control.

Other approaches for producing start pulses which vary in frequency are available. The start pulses are generated by any suitable pulse generator that produces pulses at a varying frequency and connected to point 44 on FIG. 15. The start circuit is disabled when borrow pulses, also referred to as second position pulses, are generated by the up/down counters.

ELECTRONIC STEPPING SWITCH

The stepping switch 14 in FIG. 4 is simply a counter circuit or the like which sequentially activates one output 47, 48, 49, or 50 in response to an input pulse received from the OR gate 42. For the preferred system, the switch 14 first activates output 47 in response to the first pulse received from the OR gate 42. Successive pulses received from the OR gate 42 activate stepping switch outputs 48, 49, and 50 in sequence. Further OR gate 42 output pulses cause the stepping switch 14 to activate its outputs 47, 48, 49, and 50 in a repetitive sequence. Activation of the outputs 47–50 in sequence is operative, as will become clearer later, to cause the rotor of a motor like that shown in FIG. 1 to rotate in one direction.

A switch 51 is provided for reversing the stepping switch 14 sequency, i.e., the sequence in which outputs 47, 48, 49, and 50 are activated. When the switch 51 is open circuited as shown in FIG. 4, the output sequence is as described above. However, when the switch 51 is closed, the sequence is reversed. That is, the outputs are activated in reverse order so that the output activation sequence is 50, 49, 48, 47. This reverse sequence, as will become more clear later, will cause the rotor of the motor to rotate in the reverse direction from that for the earlier described sequence because power is applied to the stator windings in reverse sequence from that described earlier.

Each output 47–50 is connected to one input of an AND gate 52, 53, 54, or 55 respectively of the gate circuit 15. The second input to each AND gate 52, 53, 54, and 55 is connected to a common inhibit wire 56. The signal normally on the inhibit wire 56 is operative to let the signals on the wires 47, 48, 49, and 50 determine which AND gate 52, 53, 54, or 55 has an active output. An inhibit signal on the inhibit wire 56 is operative to deactivate all the AND gates 52, 53, 54, and 55 so as to make all the outputs thereof inactive. The inhibit signal on wire 56 is developed in a manner to be described in greater detail later.

MOTOR POWER SUPPLY

The output of AND gate 52 is connected to one input of an associated OR gate 68. Similarly, the outputs of AND gates 53, 54, and 55 are connected to one input of associated OR gates 69, 71, and 72, respectively. The OR gates 68, 69, 71, and 72 each produce control signals at their respective outputs 58, 59, 60, and 61 which control the motor power supply 13. The motor power supply 13 has outputs labeled +V, A coil, GROUND, B coil, and −V. The +V and −V outputs are reference voltage outputs which are used by the zero crossing detector 16 which will be described in greater detail later. The GROUND output is a ground connection. The outputs labeled A coil and B coil are each connected to one end of the A coil and the B coil of a motor shown shcematically in FIG. 1. The other end of the A coil and B coil is connected to ground.

The stator winding to which power may be applied is controlled by input control signals on lines 58–61 to the motor power supply 13. When an input control signal is on line 58, the motor power supply 13 responds by placing a positive voltage on the output wire labeled A coil. When an input control signal is on line 59, the motor power supply 13 responds to place a positive voltage on the line labeled B coil. Likewise, when an input control signal is on line 60, the motor power supply 13 responds to place a negative voltage on the output line labeled A coil. In a similar manner, when an input control signal is on line 61, the motor power supply 13 responds to place a negative voltage on the output line labeled B coil.

The motor power supply 13 may comprise any conventional power supply capable of generating an output signal having both a positive and a negative voltage which is sufficient to power the connected machine. A switching mechanism is provided in the motor power supply 13 to respond to control signals on lines 58–61 so as to apply power signals to either the A coil or the B coil output wires in accordance with the input control signal. The switching mechanism can be a relay or electronic switching network responsive to the input control signals on lines 58, 59, 60, and 61.

Figure 5:
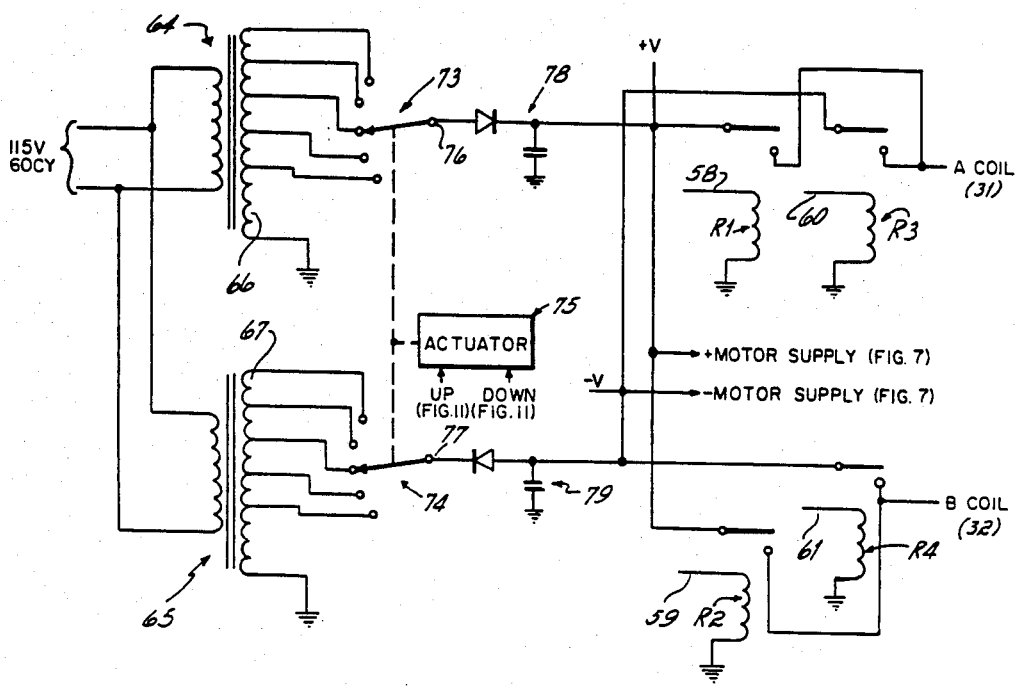
FIG. 5 is a schematic diagram for a motor power supply which will provide different voltage outputs in response to increase or decrease signals.

The circuit diagram shown in FIG. 5 is one possible power supply configuration for performing the functions described above in connection with the motor power supply 13. The circuit shown in FIG. 5 includes two identical power transformers 64 and 65 each with multiple tapped secondary coils 66 and 67 respectively, i.e., each secondary coil tap has the same voltage as the corresponding tap on the other secondary coil. Additionally, the voltage difference between any two adjacent taps of either transformer 64 or 65 is preferably the same, thus making possible incremental voltage increases at the power supply output. The output taps of each transformer 64 and 65 are connected to a stepping switch 73 and 74, respectively, each of which is actuated by a common actuator 75. The stepping switches 73 and 74 are each connected electrically to one output tap of the power transformer 64 and 65 respectively so that the voltage between the connected tap and ground for each stepping switch 73 and 74 is identical. The actuator 75 is operative in response to receipt of pulses on either the Up or Down input thereto to simultaneously switch each stepping switch 73 and 74 either in a clockwise or a counterclockwise direction. Clockwise rotation of the stepping switches 73 and 74 is operative to incrementally increase the magnitude of the voltage output at points 76 and 77 while counterclockwise rotation thereof is operative to incrementally reduce the magnitude of the voltage output at these points 76 and 77. The stepping switches 73 and 74 should include a mechanical stop to prevent either clockwise or counterclockwise rotation thereof to beyond the highest and lowest voltage output taps of the power transformers 64 and 65.

The output point 76 for the stepping switch 73 is connected to a rectifier and filtering network shown generally at 78 which is operative to produce at its output a positive DC voltage +V. The output point 77 for the stepping switch 74 is connected to a rectifying and filtering network 79 so as to produce a negative DC voltage −V at its output. The positive output of the rectifying network 78 is connected to the movable arm of relays R1 and R2. The negative output of the rectifier and filtering network 79 is connected to a movable arm of relays R3 and R4. Each of these relays R1, R2, R3, and R4 are of the single pole/single throw type with the relay contact being normally open. The output contacts of relays R1 and R3 are connected to the A coil output while the output contacts of relays R2 and R4 are connected to the B coil output. The relays R1, R2, R3, and R4 are respectively energized by input pulses on lines 58, 59, 60, and 61 from the OR gates 68, 69, 71, and 72 shown in FIG. 4. Consequently, signals on lines 58-61 are operative to connect the A coil and B coil outputs to either the positive or the negative voltage generated by the power supply in a manner previously described.

While the foregoing description of the motor power supply 13 and especially the circuitry shown in FIG. 5 has been directed to a particular embodiment therefor, it will be recognized by those skilled in the art that numerous modifications may be made to this circuit while still providing the same function. It is particularly clear that the switching functions which are performed by mechanical switches in the circuit shown in FIG. 5 can easily be replaced by electronic circuitry for accomplishing the same result. Furthermore, other circuitry may be utilized to provide a power supply having different selectable voltage outputs. For example, rotating machinery, magnetic, electronic, or mechanical regulators may be used. One such regulator is a switching regulator. Switching regulators designed according to the description in the publication entitled "Designing Switching Regulators" dated March, 1969 and distributed by the National Semiconductor Company are suitable for use in the motor power supply of the invention. A single supply with appropriate switches for reversing current in the motor windings may also be used. A single supply with appropriate switching can also power motor windings where current flow therein is unidirectional.

THE CONTROL CIRCUITRY

As stated above, the control circuitry 33 in FIG. 1 comprises five separate interconnected subsystems, shown in FIG. 4, including the plugging circuit 9, the zero crossing detector 16, the commutation circuit 17, the pulse centering circuit 25, and the voltage amplitude control circuit 26. Briefly, the zero crossing detector 16 responds to induced voltage in the stator windings to produce pulses at its output indicating when the induced voltage in a given stator winding has crossed through the zero voltage level. These zero crossing indications occur, as will become clear later, at the time when the rotor and the stator have a precise physical relationship with respect to each other. The zero crossing indications are normally utilized by the commutation circuit 17 to generate pulses on the output wire 86 which forms the second input to the OR gate 42. The signals on this wire 86 are operative to increment the electronic stepping switch 14 in the manner indicated above for pulses received on the wire 41 from the start circuit 40. These pulses received on the output wire 86 also reset the start circuit 40. Therefore, once pulses are present on the output wire 86, each of these pulses will reset the start circuit 40 preventing generation of start pulses and will also be operative to step the electronic stepping switch 14 each time a pulse is produced on the wire 86.

The commutation circuit 17 also develops control signals that are transmitted to the pulse centering circuit 25. The pulse centering circuit 25 responds to the control signals from the commutation circuit 17 to generate, at the proper time, the inhibit signal, previously mentioned, which is transmitted over the inhibit wire 56 to prevent the AND gates 52, 53, 54, and 55 from generating an active signal at any of their respective outputs. As will become more clear later, this inhibit signal on the inhibit wire 56 is operative to center the power pulses applied to the stator windings at a time when the rotor has a predetermined position. For maximum efficiency, the power pulses are centered about the time when the torque angle is 90°.

The voltage amplitude control circuit 26 is responsive to the zero crossing detector 16, the commutation circuit 17, and the pulse centering circuit 25 to generate pulses which are transmitted to the motor power supply 13 over the Up and Down wires 87 and 88, respectively. The pulses generated by the voltage amplitude control circuit 26 are operative to increase or decrease the voltage of pulses applied by the motor power supply 13 to the stator windings.

The plugging circuit 9 senses an overspeed condition and, in the event that an overspeed condition exists, causes application of a voltage to a stator winding to retard rotation of the rotor. The plugging circuit 9 responds to zero crossing indications from the zero crossing detector 16 and the position of the electronic stepping switch 14 to sense premature occurrence of a zero crossing in which case the plugging circuit 9 controls the motor power supply 13 so that a voltage is applied to a stator winding to reduce the rotor speed and thereby correct the overspeed condition. The situations in which the plugging circuit 9 is operative and the structure and operation of the plugging circuit 9 will be described in detail later. First, the other elements of the control circuit 33 in FIG. 1 will be more fully described.

ZERO CROSSING DETECTOR

The A coil output of the motor power supply 13 is connected at point 89 to the A coil 31 which is one stator winding for a machine of the type generally shown in FIG. 1. The B coil output of the motor power supply 13 is connected at 90 to the B coil 32.

The zero crossing detector 16 also connects to the connection points 89 and 90 so that the voltages induced in the A coil 31 and the B coil 32 can be detected and a zero crossing signal generated at the output thereof indicating the detection of an induced voltage zero crossing. Detection of a zero crossing for the induced voltage in an unpowered stator winding, however, is not a simple matter because, when a stator winding is switched from a conducting or powered to a non-conducting or unpowered state, the dissipation of the stored energy in the magnetic field causes two zero crossings of the voltage appearing across the winding. Consequently, the zero crossing detector 16 must be capable of differentiating between a zero crossing of the induced voltage and zero crossings associated with the dissipation of stored energy in a stator winding when it is switched from a powered to an unpowered state.

Referring briefly to FIG. 2, the rectangular areas labeled 34, 35, 36, and 37 represent time periods during which power pulses are applied to either the A coil or the B coil. During the period of time between those periods when a power pulse is applied, the movement of the rotor is operative to induce a voltage in the unpowered stator windings. For example, for the time period between the rectangular areas 34 and 36 an induced voltage appears across the A coil 31 which is indicated generally by the dashed line 91. A zero crossing for this induced voltage occurs at the point when the rotor is at its 180° position. When this condition is detected by the zero crossing detector 16, a zero crossing signal is transmitted to the commutation circuit 17 indicating that a zero crossing for the induced voltage in the A coil 31 has been detected. When the rotor reaches its 0° or 360° position, the zero crossing detector 16 also transmits a zero crossing signal to the commutation circuit 17 indicating that this zero crossing for the induced voltage in the A coil 31 has been detected.

The zero crossing detector 16 is connected to the B coil 32, and this detector 16 generates a zero crossing signal at its output at times when the rotor is at its 90° and 270° positions which correspond to the times when the induced voltage in the B coil 32 crosses through zero.

Figure 6:
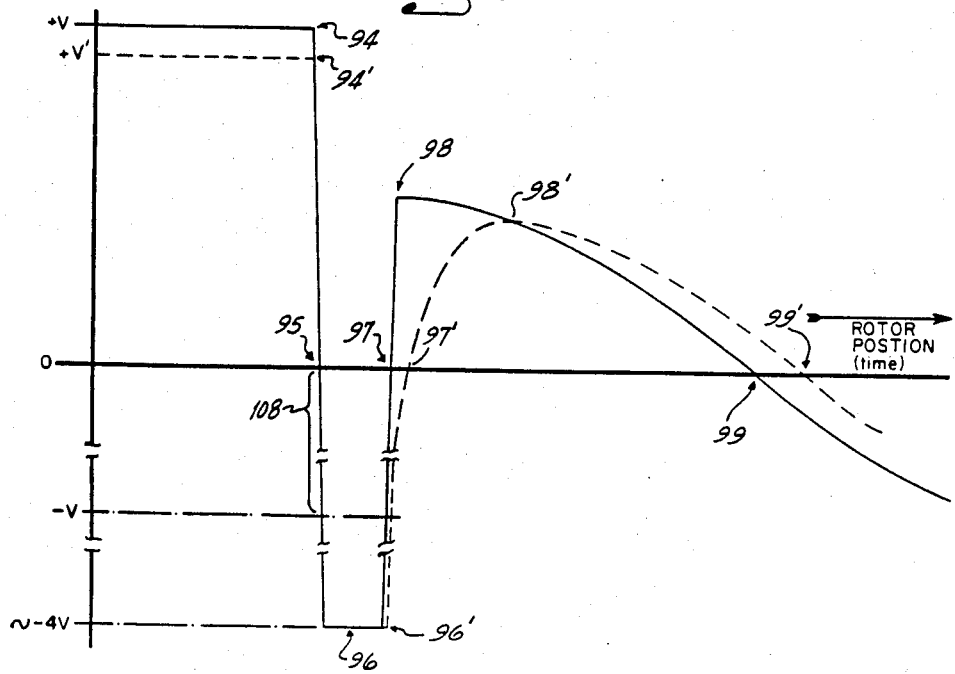
FIG. 6 is a detailed diagram showing the voltage across a stator winding during the period of time when the winding changes from powered to unpowered.

As indicated generally above, the problem of detecting zero crossings for the induced voltage in stator windings is a difficult one because of the zero crossings of the voltage appearing across a stator winding caused by dissipation of stored field energy. A wave form showing the voltage across a stator winding as it changes from a powered to an unpowered state is shown in FIG. 6. When a given stator winding is powered by a signal having a positive voltage of +V, energy is stored in the field generated thereby. When the power is removed from the stator winding, as indicated at 94, the voltage appearing across the previously powered stator winding will fall very rapidly passing through zero, as shown at 95, and then develops a large negative voltage thereacross. As shown in FIG. 4, however, zener diodes Z and diodes D are connected between the points 89 and 90 and the supply voltage points +V and −V. These diodes D and zener diodes Z arrangement is operative to limit the maximum reverse voltage appearing across a previously powered stator winding to thereby prevent damage to connected circuits. Specifically, the breakdown voltage for the zener diodes Z in the preferred embodiment is equal to three times the maximum amplitude of the winding supply voltage +V. As such, the maximum negative voltage developed across a stator winding, as indicated in FIG. 6, is equal to −4 V as indicated generally at 96. When stored energy is being dissipated, the voltage across the stator winding will remain at −4 V until substantially all of the stored energy has been dissipated. Then, the voltage across the stator winding increases very rapidly and passes through zero a second time as shown at 97 and reaches a maximum shown at 98 at which time the voltage across the stator winding is equal to the induced voltage in that winding. Then, as the rotor continues to rotate, the induced voltage appears across the unpowered stator winding. The zero crossing detector 16 must respond to the zero crossing of the induced voltage shown generally at 99 to produce a zero crossing signal at its output occurring at a time when the torque angle is 90° for the powered winding. Each zero crossing signal is used by the commutation circuit 17 to produce pulses at the time when power should normally be switched from one stator winding to another.

Referring again to FIG. 4, the zero crossing detector within the dotted line 16 includes a zero crossing detector connected to each of the stator windings shown generally at the A coil 31 and the B coil 32. The zero crossing detector for the A coil is operational to detect the zero crossing of the induced voltage which appears at point 89. In a similar manner, the zero crossing detector for the B coil is operational to detect the zero crossing of the induced voltage appearing across the B coil at point 90.

The zero crossing detector for the A coil includes a pair of ideal differential amplifiers 101 and 102 with the minus input of the amplifier 101 and the plus input of the amplifier 102 being electrically connected to the point 89. The positive input of the differential amplifier 101 is connected to the +V output from the power supply 13 while the negative input of the differential amplifier 102 is connected to the −V output of the power supply 13. For forward rotation, the differential amplifier 101 is under normal conditions strobed via the OR gate 200 whenever a signal is present on the wire 61 which indicates that a negative power pulse is applied to the B coil. The differential amplifier 102 is under normal conditions strobed via the OR gate 201 whenever a signal is present on the wire 59 which indicates that a positive power pulse is applied to the B coil. As such, whenever the wire 61 is positive, the differential amplifier 101 will produce a positive voltage at its output if the voltage across the A coil is less than +V volts. Similarly, the differential amplifier 102 is operative whenever the wire 59 is positive to produce a positive output voltage whenever the voltage across the A coil is greater than −V volts.

The output of each of the differential amplifiers 101 and 102 is connected to a wire 103. Depending on which wire 59 or 61 is positive, the voltage on the wire 103 will be positive when the voltage across the A coil 31 is greater than −V volts or less than +V volts respectively. As will be recalled from the discussion of FIG. 6, the voltage across the A coil falls within the range where the differential amplifier 101 or 102 will produce a positive output during the period of time when the A coil is changing from the powered to the unpowered state but this period of time is short. As such, a delay circuit can eliminate the effect of the zero crossings associated with power switching of the A coil voltage. Such a delay circuit is shown within the dotted line 104. This circuit produces a positive voltage at its output if a positive voltage is present on the wire 103 for a predetermined period of time. One way of implementing such a function is to provide a delay line 105 whose input is connected to the wire 103 and whose output is connected to one input of an AND gate 106. A second input to this AND gate 106 is connected directly to the wire 103 so that the output of the AND gate 106 will be positive only when both inputs thereto are positive. The delay circuit 105 is operative to delay a positive voltage from appearing at its output for 70 microseconds after the time that the input goes positive. As such, the output of the AND gate 106 will be positive only if a positive voltage is present on the line 103 for a period of time exceeding 70 microseconds.

Figure 7:
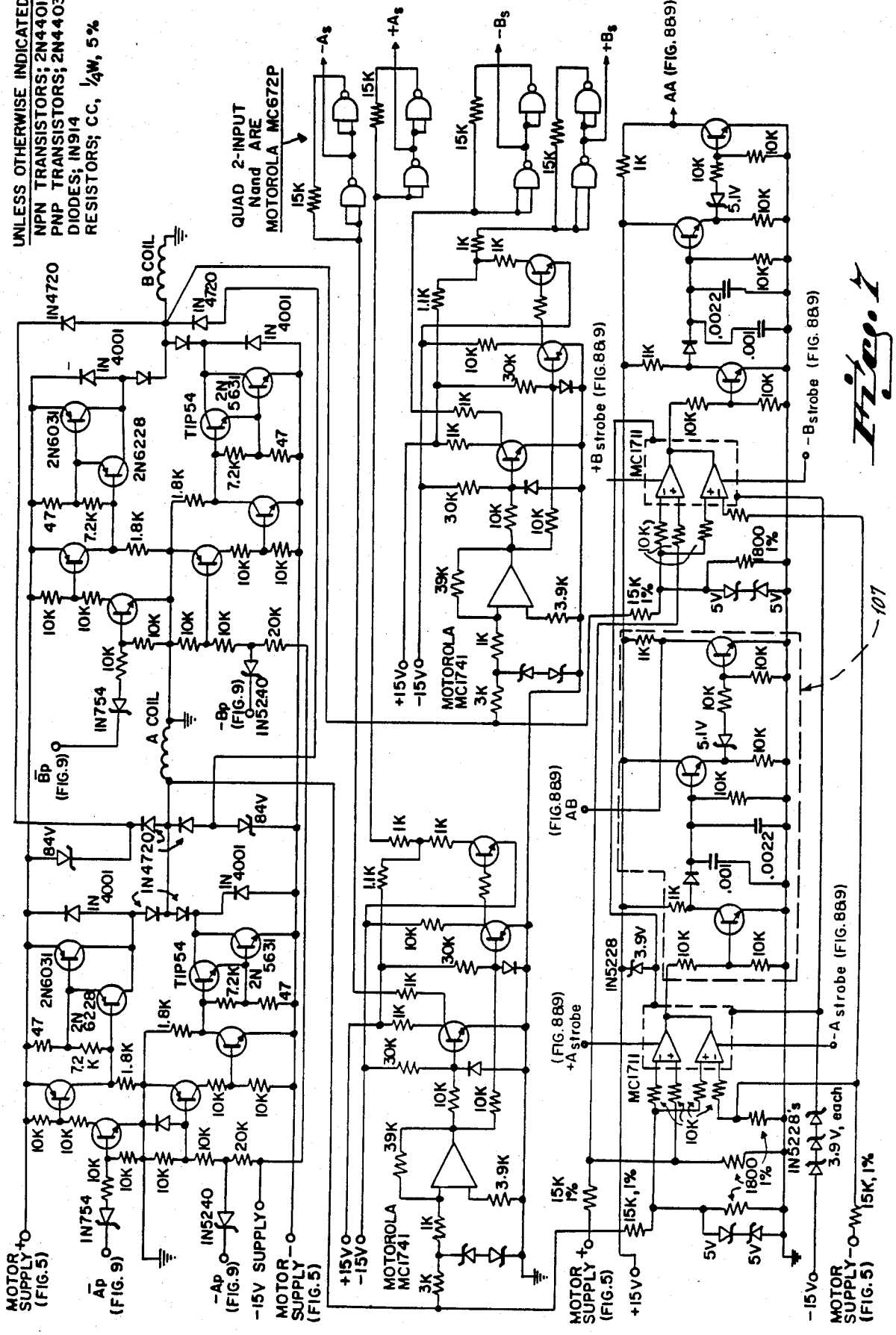
FIGS. 7-11 comprise a detailed circuit diagram showing one implementation of the control circuitry of the invention.

While the foregoing discussion has been directed to one implementation for the circuit shown within the dotted line 104, a second approach for implementing this function is shown within the dotted line 107 in FIG. 7. It will be recognized by those skilled in the art that the circuit within the dotted line 107 can be implemented by numerous other possible circuits which perform the same function.

While the circuit within the dotted line 104 in FIG. 4 has been described as producing a positive voltage at its output if a positive voltage is on the wire 103 for a period exceeding 70 microseconds, the exact delay period required before the output goes positive differs from machine to machine, and the value selected depends on the rise and fall time associated with the dissipation of stored energy in a stator winding which has been switched from a powered to an unpowered state. Specifically, referring to FIG. 6, the circuit within the dotted line 104 should not generate a positive voltage at the output during the period of time in which the voltage across a stator winding passes through a region such as that indicated at 108. If a positive voltage were to appear at the output of the circuit 104 during this period of time, a false zero crossing would be indicated. Hence, for the circuit shown in FIG. 4, the delay line 105 must have a delay longer than the time required for the voltage across the winding to fall from the voltage at 94 to less than −V volts. For other alternative circuits, a similar delay must be produced to avoid false zero crossing indications caused by the dissipation of stored energy.

Referring again to FIG. 4, the output of the circuit 104 is connected to one input of the AND gates 111 and 112. As indicated earlier, the voltage on this line will be positive whenever the input signal appearing on wire 103 has been positive itself for a period of time greater than a predetermined period of time which, for the circuit shown, is the length of the delay 105. The second input to the AND gate 111 is connected to the output of the OR gate 200 while the second input of the AND gate 112 is connected to the output of the OR gate 201. For forward rotation, the output of the OR gate 201 is positive when a positive pulse is being applied to the B coil and the output of the OR gate 200 is positive when a negative pulse is being applied to the B coil. The remaining input to the AND gate 111 is connected to the output of an inverter 113. The output of this inverter 113 will be positive whenever the induced voltage across the A coil is also positive. The remaining input to the AND gate 112, on the other hand, is electrically connected to the output of an inverter 114 whose output will be positive whenever the voltage appearing across the A coil is negative. Consequently, the output of the AND gate 111 will be positive when the induced voltage across the A coil is positive, the output of the OR gate 200 is positive indicating that a negative power pulse is being applied to the B coil, and the voltage induced across the A coil has been less than +V volts for a time period greater in time than that of the delay 105. This condition occurs just after the induced voltage across the A coil goes through zero volts going towards a positive voltage. Similarly, the output of the AND gate 112 is positive whenever the voltage induced in the A coil is negative, the output of the OR gate 201 is positive indicating that a positive power pulse is being applied to the B coil, and the induced voltage in the A coil has been greater than −V volts for a period of time greater than the time of the delay 105. This condition occurs just after the induced voltage across the A coil goes through zero volts going negative.

When the output of either AND gate 111 or 112 is positive, the OR gate 115 output becomes positive and comprises a zero crossing signal on wire 116 from the zero crossing detector 16. This output wire 116 is connected to the set input of a latch 117 and the reset input of a latch 118 in the commutation circuit 17.

The zero crossing detector for the B coil is essentially identical circuitwise to the zero crossing detector for the A coil. The zero crossing detector for the B coil includes two differential amplifiers 120 and 121. The strobe inputs for the differential amplifiers 120 and 121 are connected via the OR gates 202 and 203 to the wires 58 and 60, respectively, for forward rotation of the motor.

The output of the zero crossing detector for the B coil appears on the output wire 122. The wire 122 is connected to the reset input of the latch 117 and the set input of the latch 118 of the commutation circuit 17.

For reverse rotation, the strobe inputs for the differential amplifiers 101 and 102 are reversed and the strobe inputs for the differential amplifiers 120 and 121 are reversed. That is, the strobe input for the differential amplifier 101 is connected via the OR gate 200 to the wire 59 while the strobe input for the differential amplifier 102 is connected via the OR gate 201 to the wire 61. Also, the strobe input for the differential amplifier 120 is connected via the OR gate 202 to the wire 60 while the strobe input for the differential amplifier 121 is connected via the OR gate 203 to the wire 58. This reverse connection can be achieved very simply by a four pole/double throw switch (not shown) connected to accomplish this function.

In summary, each zero crossing detector produces a pulse at its output which is herein referred to as a position pulse. The output position pulse is produced by each zero crossing detector at a time when the rotor field is aligned with the magnetic axis of the stator winding on which the induced voltage crosses through zero. In the machine described above with two stator windings, the position pulse is generated when the torque angle is 90° for the powered stator winding. As such, a position pulse is generated four times for each rotor revolution for the two stator winding machine shown at times when the position of the rotor with respect to the stator is known and corresponds to the midpoint or symmetry point for the power pulse applied at the time of the position pulse generation.

It will be recognized by those skilled in the art that the back emf at voltages other than zero volts may be used also to determine rotor position. One such other approach is to detect when the back emf on two windings is the same amplitude which indicates a discrete rotor position, as, for example, 135° in a two phase machine.

While the above discussion provides a sensor in a two phase/two pole machine for detecting rotor position four times each rotor revolution, the position sensor may be modified to sense rotor position at other time intervals such as once per rotation. Such a modification, however, would require other modifications to be made in the remainder of the system.

The above described circuitry may also be used in machines having more than two poles without modification.

COMMUTATION CIRCUIT

As indicated generally above, the commutation circuit 17 generates pulses at its output for controlling the electronic stepping switch 14 which in turn determines the normal sequence of application of voltages to maintain rotor rotation. The commutation circuit 17 includes the latches 117 and 118. The latch 117 becomes set, and the latch 118 becomes reset, whenever a zero crossing is detected for the induced voltage in the A coil. Similarly, the latch 118 becomes set, and the latch 117 becomes reset, whenever a zero crossing is detected for the induced voltage in the B coil. As will become more clear later, the setting and resetting of the latches 117 and 118 is operative to activate the up/down counters 18 and 19 in the commutation circuit 17 in a manner to be described in greater detail.

The commutation circuit 17 includes a square wave generator 123 which produces square wave pulses at its output having a frequency of f. While the frequency f is not critical, in the preferred embodiment of the invention the square wave pulses are generated at a rate of at least 50,000 pulses per second. The output pulses of the square wave generator 123 are utilized directly by the commutation circuit 17, the pulse centering circuit 25, and the voltage amplitude control circuit 26. The output of the square wave generator 123 is also connected to a flip-flop 124 which produces at its output a square wave having a frequency of f/2. This square wave signal at the frequency of f/2 is also utilized directly by the commutation circuit 17.

The output of the latch 117 is connected to one input of an AND gate 125 and to one input of a second AND gate 126. The second input to the AND gate 125 is connected to the output of the flip-flop 124 so that the output of the AND gate 125 will be a series of pulses at a frequency of f/2 whenever the latch 117 is set. The other input to the AND gate 126 is connected to the output of the square wave generator 123 so that the output of the AND gate 126 is a series of pulses at a frequency of f whenever the latch 117 is set.

The output of the latch 118 is connected to one input of an AND gate 127 and also to one input of a further AND gate 128. The second input to the AND gate 127 is connected to the output of the square wave generator 123 so that the output of the AND gate 127 comprises a series of pulses at a frequency of f whenever the latch 118 is set. The second input to the AND gate 128 is connected to the output of flip-flop 124 so that the AND gate 128 output comprises a series of pulses at a frequency of f/2 whenever the latch 118 is set.

The commutation circuit 17 includes the two up/down counters 18 and 19. Each of the up/down counters 18 and 19 includes an up input and a down input, the counters being operative to count up when pulses are applied to the up input and operative to count down when pulses are applied to the down input. In addition, up/down counters 18 and 19 have borrow outputs 130 and 131, respectively, each of which produces a borrow pulse whenever the respective up/down counter 18 or 19 counts through zero and goes negative. Each output 130 and 131 is connected to one input of an OR gate 132 which passes a borrow pulse on either input line to its output. The output of the OR gate 132 is connected to the set input of the logic latch 23. The significance of the logic latch 23 will become more clear later.

Each up/down counter 18 or 19 has control circuitry associated therewith which prevents the counter itself from ever counting in the negative direction. Consequently, whenever either of these counters 18 or 19 begins to count up because it receives pulses at its up input, the counter will always begin counting upwardly from a value of zero.

The up input to the up/down counter 18 is connected to the output of the AND gate 125 while the down input is connected to the output of the AND gate 127. The counter 18, consequently, will count up at a rate of f/2 whenever the latch 117 is set. On the other hand, the counter 18 will count down at a rate of f whenever the latch 118 is set. On the other hand, the counter 19 has its up input connected to the output of the AND Gate 128 and the down input connected to the output of the AND gate 126. Consequently, the counter 19 will count up at a rate of f/2 whenever the latch 118 is set and will count down at a rate of f whenever the latch 117 is set.

The significance of the up/down counters 18 and 19 is that each counter, when it is counting up, will count up for a period of time which corresponds to the time actually taken for the rotor of the machine to rotate 90°. On the other hand, since the up/down counters 18 and 19, when they count down, count down at a frequency twice as fast as they count up, the borrow pulse or second position pulse generated by either up/down counter 18 or 19 is generated at a time which corresponds to the time when the machine rotor has rotated 45° beyond the point when a zero crossing of the induced voltage in one stator winding has been detected. As such whenever a borrow pulse is generated, this borrow pulse normally indicates that the rotor is positioned so that power should be switched from one stator winding to another in accordance with the sequence established by the electronic stepping switch 14 if each stator winding is powered for a period of time equal to the time required for the machine rotor to rotate 90°. If pulse widening or shortening is occurring, the switching of power pulses occurs at some other time as will become clearer later.

A timing chart showing the periods of time when the up/down counters 18 and 19 are counting up and down is shown in the lower half of FIG. 2. The times when these counters 18 and 19 are counting up and down are shown in relationship to the power pulses and the induced voltages in the A coil 31 and the B coil 32.

The commutation circuit 17 also includes the rate variable oscillator 21 which produces pulses at its output at a selected rate. The output pulses from the rate variable oscillator 21 are transmitted over a wire 133 to the set input of the speed latch circuit 22. The rate variable oscillator 21 produces pulses at a selectable rate, however, the frequency for the machine shown in FIG. 1 for these pulses is such that four evenly spaced pulses are generated during the period of time in which the rotor makes one complete revolution at the selected speed of rotation.

The output of the logic latch 23 is connected via a wire 134 to one input of an AND gate 24. The second input to this AND gate 24 is connected to the output of the speed latch 22. When both the logic latch 23 and the speed latch 22 are set, the proper input conditions to the AND gate 24 are met so that a positive voltage will appear at the output 135. This output is connected via the wire 86 to one input to the OR gate 42. Consequently, when positive voltage appears at the output of AND gate 24, the electronic stepping switch 14 is stepped to thereby normally cause a different stator winding to be actuated by the motor power supply 13.

Since both the logic latch 23 and the speed latch 22 must be set before a positive voltage is generated on the wire 86 for stepping the electronic stepping switch 14, the logic latch 23 may indeed be set at a time prior to the setting of the speed latch 22 or vice versa. The logic latch 23 is normally set before the speed latch 22, a condition which occurs when the machine is operating synchronously at the speed selected by the rate variable oscillator 21. Consequently, when a switching point is indicated by the setting of the logic latch 23, the actual switching of the stepping switch is delayed until the speed latch 22 is set. As such, the leading edge of a power pulse applied to a stator winding is delayed by a period of time corresponding to the delay between the setting of the logic latch 23 and the setting of the speed latch 22. This switching delay varies depending on the load torque on the machine and will be discussed in greater detail in connection with the pulse centering circuit 25.

When the speed latch 22 becomes set prior to the setting of the logic latch 23, the machine speed is below that of the selected speed as controlled by the rate variable oscillator 21. As such, as soon as the rotor position reaches the proper physical position for switching power from one stator winding to another, the logic latch 23 will be set in a manner previously described, and the electronic stepping switch 14 will advance to change the stator winding to which a power pulse is applied.

Both the logic latch 23 and the speed latch 22 have their reset inputs connected together and each of these are connected to the output of a delay 136. The input of this delay 136 is connected to the output of the AND gate 24 so that whenever both the logic latch 23 and the speed latch 22 are set, they will be reset automatically at a period of time equal to the delay time of the delay circuit 136 after the output of the AND gate 24 goes positive. As such, when both latches 23 and 22 become set, they will automatically be reset at a predetermined period of time later. Preferably, the delay 136 is 20 microseconds although a longer or shorter delay time can be utilized depending on the speed of the other circuits connected to the AND gate 24 output.

While a delay line can be used for the delay 136, other circuits such as a pulse stretcher which introduces a delay between the receipt of an input signal and the generation of its output signal may also be utilized. It will also be clear to those of skill in the art that other forms of circuitry may be utilized for resetting the logic latch 23 and the speed latch 22 so long as the pulse which appears at the output of the AND gate 24 has a sufficient duration to step the electronic stepping switch 14.

In summary, the zero crossing detector for detecting a zero crossing of the induced voltage appearing in the A coil 31 produces a pulse which causes the up/down counter 18 to count up at a rate of f/2. The counter 18 will continue to count up at a rate of f/2 until the zero crossing detector connected to the B coil 32 detects a zero crossing of the induced voltage in the B coil. When this latter zero crossing is detected, the number stored in the counter 18 is representative of the time required for the rotor to rotate 90°. Also, when the zero crossing is detected on the B coil, the rotor is positioned so that the torque angle between the rotor field and the stator field produced by the A coil is exactly 90°. Therefore, the rotor must rotate no more than 45° before power is normally switched from the A coil 31 to the B coil 32.

When a zero crossing of the induced voltage is detected across the B coil 32, the counter 18 immediately begins to count down at a rate of f and the counter will generate a borrow pulse or second position pulse at its output when the counter reaches zero. Since the counter 18 is counted down at a rate twice as fast as it was counted up, the counter 18 will reach a value of zero in a period of time after it starts counting down which corresponds to the time required for the rotor to rotate 45°. As such, when the borrow pulse or second position pulse is generated at the output of the counter 18, the rotor is positioned exactly at a point where the torque angle is 45° and power should normally be switched from the A coil to the B coil.

The counter 19 operates in a manner similar to the counter 18 to produce borrow pulses or second position pulses at its output at times corresponding to the time when power should normally be switched from the B coil 32 to the A coil 31. That is, the pulse from the counter 19 is generated at a time when the torque angle is 45°.

PULSE CENTERING CIRCUIT

The pulse centering circuit 25 is operative to insure that the power pulses applied to a given stator winding are applied at times always symmetric about the time when the torque angle is a predetermined value. That is, for a machine having a desired average torque angle of, for example, 90°, the power pulses applied to stator windings must be centered at the time when the torque angle is 90°. For less than maximum machine efficiency, the power pulses can be applied to stator windings when the torque angle is other than 90°.

The pulse centering circuitry 25 centers the power pulses applied to stator windings in the following manner. In general, the pulse centering circuit detects the time period between the 45° firing point and the actual pulse firing and foreshortens the pulse at its trailing edge by that same period. More specifically, when the logic latch 23 becomes set, a condition which occurs when the rotor is at a 45° position, a positive voltage indicating that the logic latch is set is transmitted over a wire 137 to the start input of a counter 138. This signal is operative to turn on the counter 138 which counts pulses on the wire 149 from the square wave generator 123 at a rate of f. The counter 138 counts up at a rate of f until the speed latch 22 is set. When the speed latch 22 is set, a positive voltage is transmitted over a wire 139 to the stop input of the counter 138, causing the counter 138 to stop counting. The count stored in the counter 138, after being stopped, is a measure of the time between the setting of the logic latch 23 and the setting of the speed latch 22. As such, the counter 138 contains a count indicative of the time that the power pulse application has been delayed because the logic latch 23 was set prior to the speed latch 22. In other words, the counter 138 stores a number indicating the extent of leading edge pulse shortening which has occurred as a result of the operation of the commutation circuit 17.

The information stored in the counter 138 is utilized to shorten the trailing edge of the power pulse applied to a stator winding. This pulse shortening of the trailing edge is accomplished by a comparison circuit 140. The value of the counter 138 is transmitted to the comparison circuitry 140 via cables shown at 142. The counter 138 data is compared in comparison circuit 140 with the value of either counter 18 or 19, depending on which counter 18 or 19 is being counted down. Each bit position of the counters 18 and 19 is connected to one input of one AND gate such as 143 and 144 respectively. The second input to the AND gate 143 is connected to the output of the latch 118 which indicates that the counter 18 is counting down. The second input to the AND gate 144 is connected to the output of the latch 117 which indicates that the counter 19 is counting down. The output of each AND gate 143 and 144 is connected to one input of an OR gate 145 whose output is then connected to the input to the compare circuit 140.

The compare circuit 140 is operative to determine when the stored value in either counter 18 or 19 counts down to the value stored in the counter 138. That is, whenever the counter 18 or 19, whichever counter is counting down, reaches a value identical to that stored in the counter 138, the compare circuit 140 generates an inhibit signal at its output which is connected via the wire 56 to one input of each of the AND gates 52, 53, 54 and 55. The inhibit pulse on the inhibit wire 56 will remain active until a pulse is generated on the wire 86 indicating that a power pulse should be applied to the next stator winding in sequence as controlled by the electronic stepping switch 14. Therefore, the operation of the pulse centering circuit 25 is to generate an inhibit signal on the inhibit wire 56 at precisely the time required so that the power pulse applied to a given stator winding is symmetric about the time when the torque angle, for the powered stator winding, is on average equal to a preselected value which, for the circuit discussed, the pulses are symmetric about the time when the torque angle is 90°.

In summary, the pulse centering circuit 25 and the commutation circuit 17 operate together to widen or narrow the power pulses applied to the stator windings. The power pulses are widened when the load torque increases and narrowed when the load torque decreases. The speed of the machine, however, remains at the selected speed as defined by the setting of the rate variable oscillator 21 and the average torque angle remains constant.

MOTOR POWER SUPPLY VOLTAGE CONTROLS

The voltage output of the motor power supply 13 shown in FIG. 4 may be controlled by the power supply voltage amplitude control circuit 26. The voltage amplitude control circuit 26 produces signals at either its up or down output for either increasing or decreasing the pulse amplitude produced at the power supply 13 output. As already indicated, by increasing or decreasing the amplitude of power pulses applied to the stator windings, the machine can run at a constant speed and at a predetermined efficiency even when the load torque varies widely, and the width of the power pulses can be held within a predetermined range.

The voltage control circuit 26 includes a modulo N counter 148, a counter which produces a single pulse at its output each time N pulses are received at its input. The value stored in the counter 138 is transmitted over the multi-wire cable 142 to the modulo N counter 148. This stored value in the counter 138 comprises the N input into the modulo N counter 148. A second input to this counter 148 comprises the square wave signal on line 149 from the square wave generator 123. The modulo N counter 148, however, is operative only when an enable signal is present at the enable input thereto. The enable signal is present from the time when a stator winding is switched to a powered state, i.e., current is conducting therethrough, until the next zero crossing is detected by a zero crossing detector. The enable signal is generated by an enable latch 150. This enable latch 150 is set whenever a pulse appears on the wire 86 which occurs when the commutation circuit 17 determines that power should be switched from one stator winding to another. The enable latch 150 is reset whenever the next zero crossing is detected by the zero crossing detector 16. The wires 116 and 122 comprise inputs to an OR gate 151 whose output is connected to the reset input of the enable latch 150. Thus, the latch 150 is reset when a zero crossing is detected as indicated by a positive voltage on either wire 116 or 122.

The modulo N counter 148 when enabled, as indicated above, produces at its output 152 a pulse for every N pulses received from the square wave generator 123. Each output pulse on the output wire 152 is counted by a counter 153 shown in FIG. 4 as the K5 counter. As such, the counter 153 holds a number after the counter 148 turns off which is an indication of the pulse width of power pulses applied to stator windings. For example, if the value stored in the counter 153 is large, this indicates that the count stored by the counter 138 is low and, therefore, the turnon delay, i.e., the time delay between the setting of the logic latch 23 and the setting of the speed latch 22, is small. As such, each power pulse applied to a stator winding is long in time and is approaching the time period required for the rotor to turn 90°. Under this condition, the machine is operating with relatively high load torque, and the power pulses are wide to prevent slow down.

On the other hand, should the value of the counter 153 be small, this indicates that the count stored by the counter 138 is very large and that the power pulses applied to stator windings are relatively short. Under this condition, the machine is operating with a relatively low load torque and the power pulses are short to prevent speed up.

As indicated above, the objective of the voltage control circuit 26 is to incrementally vary the amplitude of pulses applied to stator windings so as to respond to large load torque variations in a manner which maintains constant speed at a selectable torque angle. Power pulse amplitude changing also permits the machine to operate with power pulses having a duration close to the time required for the rotor to rotate 90° at the selected speed thereby evening the generated torque during each revolution of the rotor. To accomplish this objective, the value stored in the counter 153 at the conclusion of the counting period, i.e., when the enable latch 150 is reset, is compared with a preset low value by a comparison circuit 154. If the value stored in the counter 153 is less than a predetermined value set into the comparison circuit 154 by mechanical switches or the like as indicated generally by the input line 155, then the comparison circuit 154 will generate a signal at its output 156 indicating the value of the counter 153 is less than the predetermined value. This indicates that the width of the power pulse applied to a stator winding is less than a predetermined desired value.

The count stored in the counter 153 is also transmitted over a wire 158 to a second comparison circuit 159.

This second comparison circuit 159 receives from preset switches or the like, as indicated generally by the input line 160, a number from switches (not shown) indicating the high or upper value acceptable for the number which is stored in the counter 153 during the period while the enable latch 150 is set. If the actual count stored in counter 153 during the enable period is greater than the acceptable upper value, then the comparison circuit 159 generates a pulse at its output 161 indicating that the value of counter 153 has exceeded the acceptable upper value. This condition indicates that the pulse width of the power signal applied to a stator winding is greater than desired.

When the output of the comparison circuit 154 indicates that the counter 153 is less than a preset lower limit, this condition indicates that the power applied to a given stator winding should be reduced. As such, this signal could be utilized directly by the motor power supply to decrease the voltage applied to each of the stator windings. However, in order to avoid undo "hunting" by the motor power supply 13, i.e., unnecessary voltage changing, a comparison counter 162 is provided to count the number of pulses, which indicate a voltage decrease request, from the comparison circuit 154. If the comparison counter 162 receives a predetermined number of voltage decrease request pulses, as set on a preset line 163 by switches or the like (not shown), following successive periods of time during which the enable latch 150 is set, then the comparison counter 162 will generate a pulse on its output 88 indicating that the voltage of the motor power supply should be reduced. This pulse is connected to the down input of the motor power supply 13 which is operative in the manner previously described to incrementally decrease the voltage of power pulses applied to the machine stator windings.

When the comparison circuit 159 generates a pulse at its output 161, this is an indication that the value stored in the counter 153 during the period when the enable latch 150 was set exceeds a predetermined high value as set by preset switches or the like indicated generally by the input line 160. The pulse generated at the output 161 indicates that the power pulses being applied to the stator windings are wide and that they exceed the desired predetermined maximum width. Consequently, the amplitude of power pulses applied to stator windings should be increased. Again, in order to avoid undo hunting by the motor power supply 13, a comparison counter 164 is provided to count successive amplitude increase requests received on the line 161, and, if the number of these successive requests, i.e., requests generated by the comparison circuit 159 following successive periods of time when the enable latch 150 is set, exceeds the preset amount indicated by the present number input 163, then the comparison counter 164 produces a pulse on the wire 87 which is connected to the up input to the motor power supply 13. This pulse is operative in a manner described earlier to incrementally increase the amplitude of power pulses applied to stator windings by the motor power supply 13.

As indicated above, the comparison counter 154 produces a pulse at its output wire 156 if the value stored in the counter 153 is less than the preset value input 155. The comparison counter 154 produces a pulse on an output wire 167 if the value stored by the counter 153 is equal to or greater than the preset value input 155. The pulses on the wire 167 are utilized to reset the comparison counter 162 to zero. Therefore, the comparison counter 162 will generate a pulse at its output 88 only if a preset consecutive number of pulses, as defined by the preset number input 163, occur on the wire 156. In this manner, a delay is built into the system before the power pulse amplitude is changed to assure that short duration circuit transients do not trigger the amplitude change circuitry.

In a similar manner, the comparison counter 159 produces a pulse at its output wire 161 if the value stored in the counter 153 is greater than the preset upper value input at the input 160. If the counter 153 is less than or equal to the upper value 160, then the counter 159 produces a pulse on the wire 168 which is connected to the reset of the comparison counter 164. Consequently, requests to increase the power pulse amplitude on the wire 87 are not generated unless a predetermined number, as defined at 163, of such consecutive requests are generated on the wire 161.

In summary, the voltage control circuit 26 is operative to increase or decrease the power pulse amplitude in response to large increases or decreases in load torque or changes in line voltage so as to maintain operation at a selectable speed and at a selected average torque angle.

PLUGGING CONTROL CIRCUIT

The plugging circuit 9 remedies overspeed conditions which might develop during operation of the motor 10 in FIG. 1. The plugging circuit 9 assures synchronous operation of the motor 10 at the constant selectable speed established by the rate variable oscillator 21. The condition of the motor 10 which leads to the functioning of the plugging circuit 9 will first be described so as to facilitate an understanding of the structure and operation of the plugging circuit 9.

Figure 17:
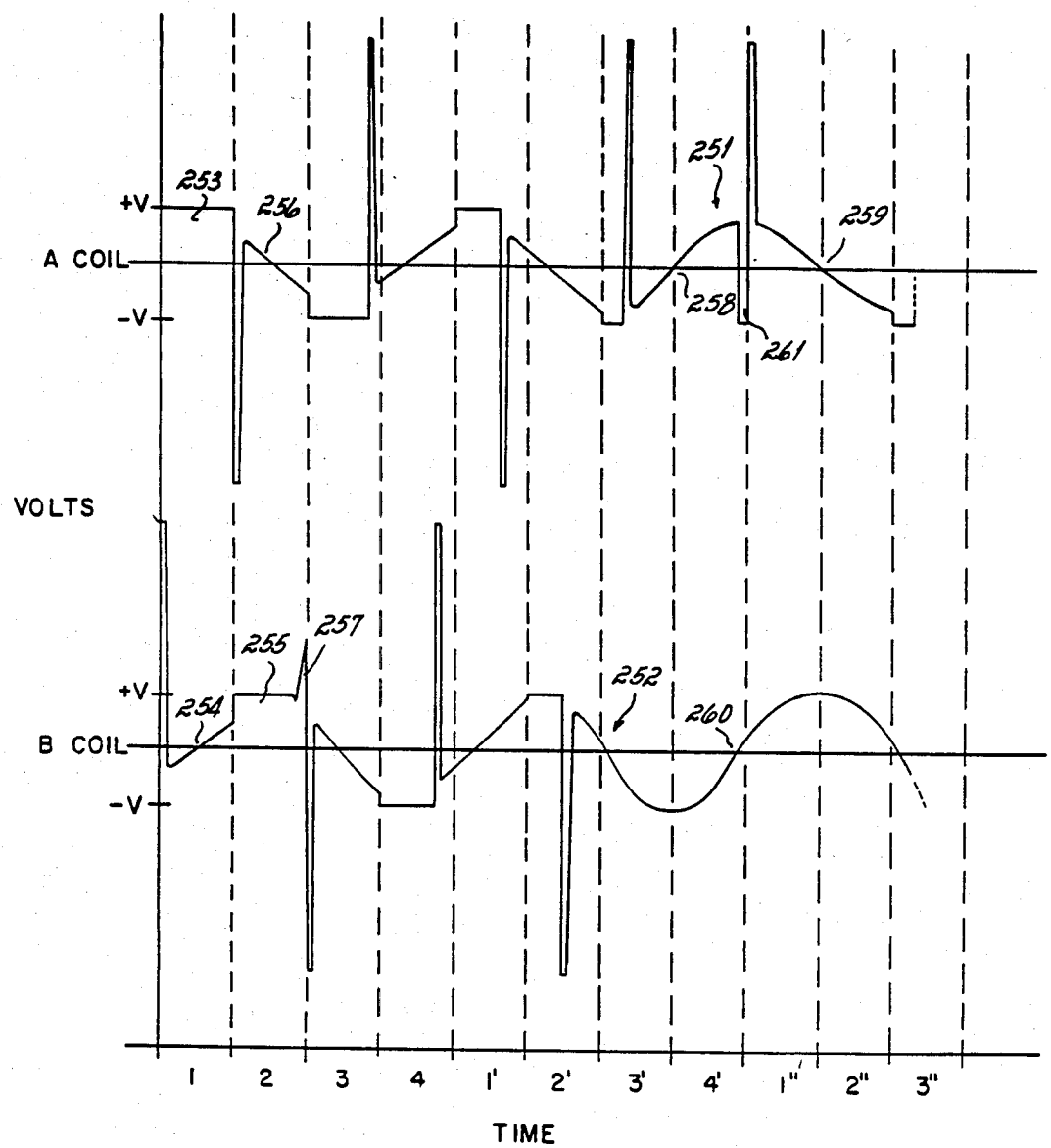
FIG. 17 shows voltages across the stator windings of the machine in FIG. 1 in the event of an overspeed condition and demonstrates speed control by means of plugging.

With reference to FIG. 17, the voltage across the stator windings is plotted as a function of time. The curve 251 represents the voltage across the A coil, and the curve 252 represents the voltage across the B coil. The time is divided into periods, 1, 2, 3, 4, 1', 2', 3', 4', 1", 2", 3", etc.

Time period 1 corresponds generally to a portion of the operational sequence in FIG. 2 and depicts normal operation of the motor 10. Specifically, a positive voltage pulse 253 in FIG. 17 corresponds to the voltage pulse 34 in FIG. 2. The voltage pulse 253 is applied at the beginning of time period 1 and is removed at approximately the end of time period 1. The voltage pulse 253 is applied symmetrically about the time at which the voltage induced across the B coil crosses through zero volts as indicated at 254. Consequently, the motor 10 is operating at constant selectable speed and constant average torque angle with the voltage pulse width and symmetry being maintained by the pulse centering circuit 25 and the voltage pulse amplitude being adjusted by the voltage amplitude control circuit 26 to keep the voltage pulse width within predetermined limits. Normal operation continues as time period 2 commences. Thus, a positive voltage pulse 255 in FIG. 17, which corresponds to voltage pulse 35 in FIG. 2, is applied to the B coil at the beginning of time period 2. The voltage pulse 255 is applied symmetrically about the time at which the voltage induced across the A coil crosses through zero volts as indicated at 256.

The above relates to normal operation. Suppose that an event occurs which tends to increase the rotor speed. As shown in FIG. 17, a sharp rise in the line voltage producing the spike 257 may be the event that tends to increase the rotor speed. The rotor speed may increase, however, due to any one of a number of events well-known to those of skill in the art, for example, removal of the load from the motor 10. Manual decrease of the speed established by the rate variable oscillator 21 during normal operation also produces an overspeed condition.

An overspeed condition may also develop during start-up of the motor 10. Initially, the start circuit 40 in FIG. 4 controls the electronic stepping switch 14 to cause the motor power supply 13 to apply the proper voltage in the correct sequence to the stator windings. When, however, the rotor speed is such that the rotating magnetic field of the rotor induces a detectable voltage in the stator windings, the commutation circuit 17 assumes control of the electronic stepping switch 14. When the commutation circuit 17 becomes operative, the pulse centering circuit 25 and voltage amplitude control circuit 26 also become operative such that they increase the width and/or amplitude of the voltage pulses applied to the stator windings if the rotor is not at the selectable speed established by the rate variable oscillator 21. Eventually, the instantaneous rotor speed will equal the selectable speed established by the rate variable oscillator 21, but the width and amplitude of the voltage pulses may be such as to accelerate the rotor above the desired speed creating an overspeed condition. Stated differently, the operation of the pulse centering circuit 25 and the voltage amplitude control circuit 26 tend to cause the rotor speed to overshoot the selectable speed established by the rate variable oscillator 21 during start-up. A similar situation may develop during operation due to manual increase of the speed established by the rate variable oscillator 21.

Furthermore, if overshoot occurs, the pulse centering circuit 25 and voltage amplitude control circuit 26 become operative such that they decrease the width and/or amplitude of the voltage pulses applied to the stator windings in an attempt to synchronize the speed of the rotor to the selectable speed established by the rate variable oscillator 21. Consequently, deceleration of the rotor by frictional load, gravitational forces, etc. reduces rotor speed. The deceleration, however, may cause the rotor speed to undershoot the speed established by the rate variable oscillator 21. Hence, the voltage pulse width and/or amplitude are increased. Consequently, the rotor speed may again overshoot the selectable speed. This sequence may repeat so that the rotor speed oscillates about the selectable speed, thereby resulting in instability of the motor 10. Thus, the motor 10 may not become synchronous at the speed established by the rate variable oscillator 21.

Referring again to FIG. 17, the rotor speed is shown to increase after the event 257 occurs. Since the zero crossings of the induced voltage in the stator windings occur at certain orientations of the rotor with respect to the stator, the rate at which the zero crossings of the induced voltage occur is an indication of rotor speed. Hence, the increase in rotor speed is observed in FIG. 17 by reason of the increase in the rate of occurrence of the zero crossings. This is evidenced by the fact that the zero crossings of the induced voltage in the B coil appear earlier in each of the time periods 3, 1' and 3' whereas the zero crossings of the induced voltage in the A coil appear earlier in each of the time periods 4 and 2' and, as shown, a zero crossing 258 of the voltage induced across the A coil occurs at the beginning of time period 4'.

That the rotor is overspeed is best evidenced by the fact that the zero crossing 260 of the induced voltage across the B coil occurs prior to the beginning of time period 1''. That is, since the zero crossing 260 of the induced voltage across the B coil occurs prior to the beginning of time period 1'', the motor 10 is overspeed.

As shown in FIG. 17, a negative voltage is preferably applied to the A coil so as to produce a plugging voltage 261 between the time that the zero crossing 260 of the voltage induced across the B coil occurs and the beginning of time period 1''. By plugging in the A coil, the plugging voltage 261 appears near the time that the torque angle between the rotor and the A coil is approximately 90°. This gives near maximum plugging torque per ampere of plugging current and therefore provides an efficient method for retarding rotor speed. Of course, plugging could be done in a different manner such as by simultaneously applying a negative voltage to the A coil and the B coil or by applying a negative voltage to the B coil instead of the A coil from the time that the zero crossing 260 of the induced voltage across the B coil occurs and the beginning of time period 1''. By plugging in the B coil, however, the plugging voltage would appear near the time that the torque angle between the rotor and the B coil is approximately 0°. This gives near minimum plugging torque per ampere of plugging current and therefore is an inefficient method for retarding rotor speed. Nevertheless, where it is desired to use maximum available plugging torque to slow the rotor, plugging should simultaneously occur in both the A coil and the B coil.

The plugging current is a function of the difference between the applied voltage and the voltage which is induced across the stator winding which is plugged. As shown in FIG. 17, the voltage which is induced across the A coil is near maximum and approximately equal and opposite to the applied, or plugging, voltage 261. This yields a plugging current which is quite high. Because torque is a function of current, torques due to plugging are also high, thus slowing the rotor rapidly as is indicated in FIG. 17. Consequently, the overspeed condition is remedied almost immediately, and the rotor speed returns to synchronism at the selectable speed established by the rate variable oscillator 21 in FIG. 4.

FIG. 17 shows an example of one case in which plugging occurs. Of course, an overspeed condition could occur at any point during the operation of the motor 10. From FIG. 17, however, it can be seen that plugging preferably commences at the time that a zero crossing occurs in the time period preceding that in which it is supposed to occur. Plugging preferably continues until the beginning of the next time period, that is, until the beginning of the time period during which the zero crossing is supposed to occur when the motor 10 is operating at set speed.

Having described the situations in which plugging results and having presented an example of plugging and its effect on operation of the motor 10, an embodiment of the plugging circuit 9 will now be described in connection with FIG. 4. Generally, in the case of the motor 10, if a zero crossing occurs in the voltage induced across one stator winding during a time period prior to the time period in which it is supposed to occur, a voltage is applied to the second stator winding with an opposite polarity to the induced voltage appearing across the second stator winding. This will result in the desired plugging to remedy an overspeed condition and synchronize the rotor speed to the selectable speed established by the rate variable oscillator 21.

In order to sense when a zero crossing of the induced voltage across a stator winding occurs in a prior time period due to an overspeed condition, the differential amplifiers of the zero crossing detector 16 must be strobed at the proper times. As described earlier, the normal sequence for application of voltage to the motor 10 for rotation in the forward direction is positive voltage to the A coil, positive voltage to the B coil, negative voltage to the A coil, negative voltage to the B coil, positive voltage to the A coil, etc. Also, during the time that positive voltage is being applied to the A coil, differential amplifier 120 is strobed to enable detection of a positive going zero crossing of the voltage induced across the B coil. During the time that positive voltage is being applied to the B coil, differential amplifier 102 is strobed to enable detection of a negative going zero crossing of the voltage induced across the A coil. During the time that negative voltage is being applied to the A coil, differential amplifier 121 is strobed to enable detection of a negative going zero crossing of the voltage induced across the B coil. Finally, during the time that negative voltage is being applied to the B coil, differential amplifier 101 is strobed to enable detection of a positive going zero crossing of the voltage induced across the A coil. As described earlier in connection with FIG. 17, in the case of an overspeed condition, a zero crossing will occur during a time period preceding that in which it is supposed to occur. In FIG. 17, for example, the positive going zero crossing 260 of the voltage induced across the B coil appears in time period 4' instead of time period 1". To sense an overspeed condition, therefore, differential amplifiers 101, 102, 120, and 121 in FIG. 4 must also be strobed at times to enable detection of a zero crossing which occurs earlier than it is supposed to occur.

When an inhibit signal appears on line 56, the output of inverter 204 will be positive. This indicates that no voltage is being applied to the A coil or B coil such that the voltage that appears across either of these stator windings is voltage induced thereacross by the rotating rotor field. Hence, zero crossings will represent zero crossings of induced voltage.

The output of inverter 204 is connected to one input of each of the AND gates 205, 206, 207, and 208. The second input of the AND gate 206 is connected to the line 47. The line 47 as indicated earlier will be positive when the electronic stepping switch 14 indicates that a positive voltage should normally be applied to the A coil. As shown in FIG. 17, this corresponds to time periods 1, 1', 1", etc. which are the time periods preceding those in which a negative going zero crossing of the voltage induced across the A coil normally occurs. Therefore, the output of the AND gate 206 will be positive when no voltage is being applied to the A coil or the B coil and during the time period preceding that during which a negative going zero crossing of the voltage induced across the A coil is supposed to occur.

The output of the AND gate 206 is connected to a second input of the OR gate 201. Consequently, the differential amplifier 102 will be strobed so as to enable detection of a premature negative going zero crossing of the voltage induced across the A coil that is indicative of an overspeed condition.

The second inputs of the AND gates 205, 207, and 208 are connected to lines 49, 50, and 48, respectively, when rotation of the motor 10 is in the forward direction. The outputs of the AND gates 205, 207, and 208 are connected to the second inputs of the OR gates 200, 202, and 203, respectively. Thus, the differential amplifier 121 will be strobed so as to enable detection of a premature negative going zero crossing of the voltage induced across the B coil that is indicative of an overspeed condition. In a similar manner, the differential amplifier 101 will be strobed so as to enable detection of a premature positive going zero crossing of the voltage induced across the A coil evidencing an overspeed condition. Furthermore, the differential amplifier 120 will be strobed so as to enable detection of a premature positive going zero crossing of the voltage induced across the B coil which indicates an overspeed condition as shown at 260 in FIG. 17.

The plugging circuit 9 controls the motor power supply 13 to apply voltage so as to plug the appropriate stator winding when an overspeed condition is indicated. As described in connection with FIG. 17, the voltage caused to be applied by plugging circuit 9 has an opposite polarity to the voltage induced across the stator winding which is plugged.

The strobing of the differential amplifiers 101, 102, 120, and 121 to enable detection of an overspeed condition has been described above. The operation of the zero crossing detector 16 has been described earlier. Therefore, when an overspeed condition is present, one of the lines 209–212 will be positive. As shown in FIG. 4, lines 209–212 are connected to one input of the AND gates 213–216, respectively.

The second input of the AND gate 214 is connected to line 47. When a negative going zero crossing of the voltage induced across the A coil occurs during a time period preceding the one in which it normally should occur, both inputs to the AND gate 214 will be positive. Consequently, the output of the AND gate 214 will be positive and will set the latch 217. When the latch 217 is set, its output is positive, and, since the output of the latch 217 is connected to the second input of the OR gate 72, the output of the OR gate 72 will be positive. Consequently, the motor power supply 13 will apply a negative voltage so as to plug the B coil.

The second input of the AND gate 216 is connected to line 48. When a negative going zero crossing of the voltage induced across the B coil occurs during a time period preceding the one in which it normally should occur, both inputs to the AND gate 216 will be positive. Consequently, the output of the AND gate 216 will be positive and will set the latch 218. When the latch 218 is set, its output is positive, and, since the output of the latch 218 is connected to the second input of the OR gate 68, the output of the OR gate 68 will be positive. Consequently, the motor power supply 13 will apply a positive voltage so as to plug the A coil.

The second input of the AND gate 213 is connected to line 49. When a positive going zero crossing of the voltage induced across the A coil occurs during a time period preceding the one in which it normally should occur, both inputs to the AND gate 213 will be positive. Consequently, the output of the AND gate 213 will be positive and will set the latch 219. When the latch 219 is set, its output is positive, and, since the output of the latch 219 is connected to the second input of the OR gate 69, the output of the OR gate 69 will be positive. Consequently, the motor power supply 13 will apply a positive voltage so as to plug the B coil.

Finally, the second input of the AND gate 215 is connected to line 50. When a positive going zero crossing of the voltage induced across the B coil occurs during a time period preceding the one in which it normally should occur, both inputs to the AND gate 215 will be positive. Consequently, the output of the AND gate 215 will be positive and will set the latch 220. When the latch 220 is set, its output is positive, and, since the output of the latch 220 is connected to the second input of the OR gate 71, the output of the OR gate 71 will be positive. Consequently, the motor power supply 13 will apply a negative voltage so as to plug the A coil as shown in FIG. 17 at 261.

Thus, when an overspeed condition is present, the plugging circuit 9 causes the motor power supply 13 to apply a voltage so as to plug one of the stator windings. This plugging voltage is applied at a time that an overspeed condition is indicated by the zero crossing detector 16 due to the occurrence of a zero crossing earlier than it is supposed to occur at the selectable speed established by the rate variable oscillator 21.

As shown in FIG. 4, the reset terminal of each of the latches 217–220 is connected to the line 86. Consequently, when the next time period, that is, the one in which the zero crossing would have occurred but for the overspeed condition, commences, the plugging voltage is removed due to operation of the commutation circuit 17.

When rotation of the motor 10 is in the reverse direction, line 47 is connected in place of line 49 to the second input of the AND gate 205. Also, line 49 is connected in place of line 47 to the second input of the AND gate 206. Similarly, line 48 is connected in place of line 50 to the second input of the AND gate 207. Also, line 50 is connected in place of line 48 to the second input of the AND gate 208. These reverse connections can be achieved very simply by a four pole/double throw switch (not shown) connected to accomplish this function.

In summary, the plugging circuit 9 causes the motor power supply 13 to apply a voltage so as to plug one of the stator windings when the motor 10 is overspeed. The plugging circuit 9 responds to position pulses from the zero crossing detector 16 and to the state of the electronic stepping switch 14 and determines whether a zero crossing occurs prior to the time that it should occur. If the zero crossing is premature, an overspeed condition is indicated, and the plugging circuit 9 controls the motor power supply 13 to apply voltage so as to plug one of the stator windings. Plugging results in retardation of the rotor rotation and consequent reduction in the rotor speed, thereby remedying the overspeed condition.

By use of plugging, overspeed conditions which occur due to decrease or removal of the load, increase in line voltage, or manual decrease of the selectable speed established by the rate variable oscillator 21 are corrected. Moreover, oscillation of the rotor speed, due to overshoot and undershoot of the selectable speed established by the rate variable oscillator 21 during startup or manual increase in the selectable speed, is prevented. Consequently, the use of plugging assures stable, synchronous operation of the motor 10 at a fixed selectable speed.

Figure 11:
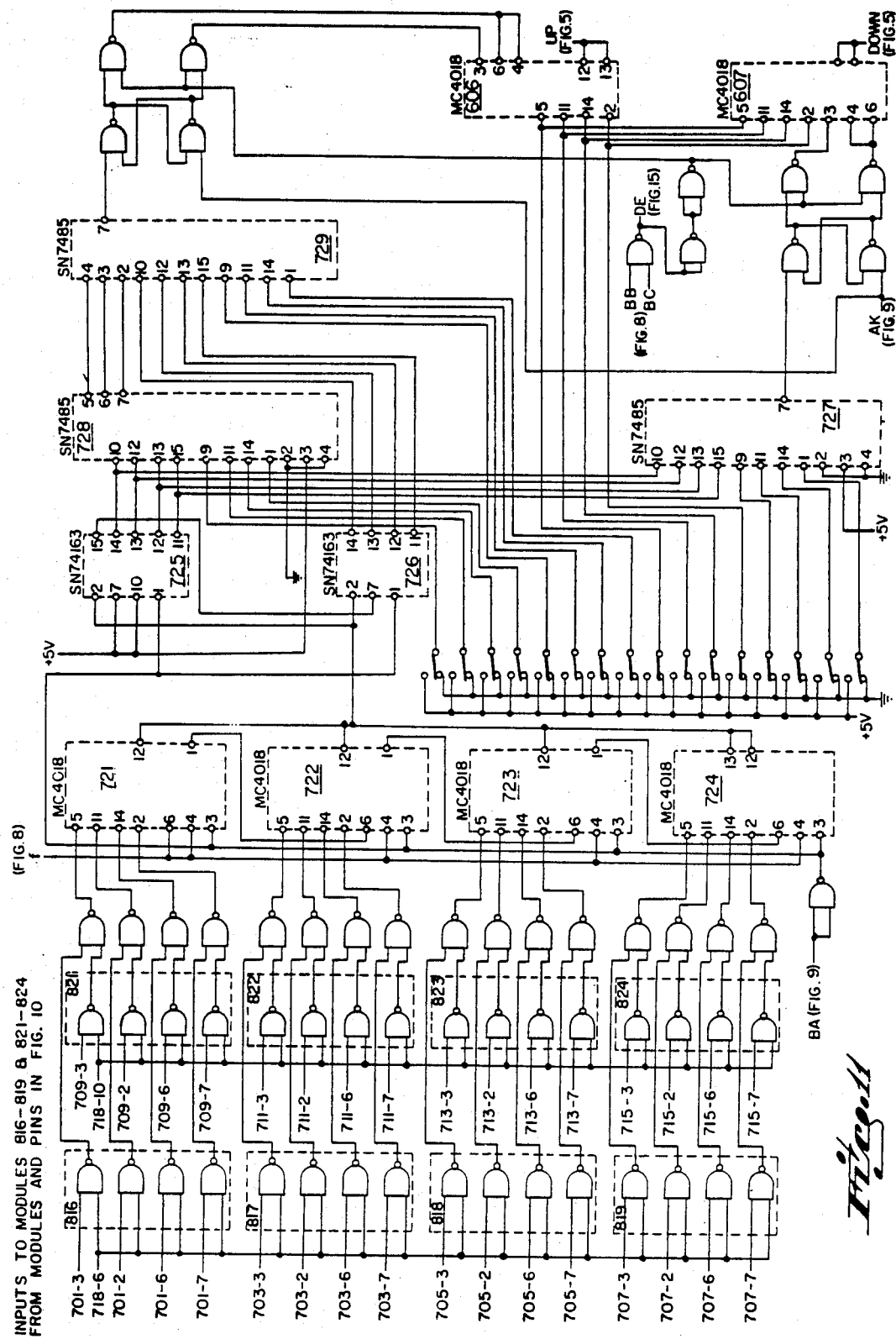

It has been found that the use of plugging can effectively supplant the need for voltage amplitude control. Consequently, this invention contemplates the elimination of the voltage amplitude control circuit 26 when the plugging circuit 9 is included. This may be accomplished by adjusting the magnitude of the voltage for the motor power supply 13 to the desired value. By way of example, the movable contacts 73 and 74 in FIG. 5 would be positioned to corresponding taps on the secondary windings 66 and 67, respectively. The taps would be selected so that the voltage magnitude is sufficient to enable the motor 10 to attain any speed in a desired range of selectable speeds under expected maximum load. Furthermore, the connection between the amplitude control circuit 26 and the motor power supply 13 in FIG. 4a is open-circuited as are lines 87 and 88 in FIG. 4. Also, the up and down terminals in FIG. 11 are disconnected from the up and down inputs, respectively, to the actuator 75 in FIG. 5.

Where the motor 10 is expected to operate over a wide range of loads or speeds, however, the voltage amplitude control circuit 26 is preferably included. This allows the voltage pulse width to be maintained within predetermined limits so that the motor 10 runs smoothly. Otherwise, the voltage pulse width may become too narrow under small loads or at low speed which tends to make the motor 10 unstable and leads to repeated operation of the plugging circuit 9, thereby causing the motor to surge.

The foregoing description of a preferred embodiment of the invention has been made with particular emphasis on the block diagram shown in FIG. 4. The function of each element shown in the system diagram of FIG. 4 has been fully explained and, in many instances, specific circuits have been described for implementing these functions. For those circuits which have not specifically been described, numerous approaches for implementing these functions will occur to those skilled in the art. The exact implementation for the preferred embodiment of the control circuitry of the invention is shown in FIGS. 7–11. In these drawings, the exact circuit diagram is shown including specific circuits for a typical machine characterized by this invention. The only modifications which may be necessary to adapt the circuits there shown to a given application would be to include voltage level shifting circuitry to accommodate a machine whose stator windings were powered by signals having different voltages than that for which the circuit was designed.

OTHER MACHINE CONFIGURATIONS

While the foregoing description has been made with particular emphasis on a machine having two stator windings, i.e., a two phase machine, as shown schematically in FIG. 1, the principles of this invention apply to machines having different stator winding configurations. For example, three phase/four wire machines, of the type shown schematically in FIG. 12 can also be controlled by systems generally of the type described above, although certain minor modifications are necessary because three stator windings are utilized rather than two.

The machine shown schematically in FIG. 12 is a three phase/four wire machine which includes three stator windings labeled the A coil, the B coil, and the C coil. These coils are physically part of the stator, shown generally at 176, and are arranged so that the axis of each magnetic field is arranged at an angle of 120° to the axis of the field generated by the other two stator windings. The rotor, shown generally at 177, is of the permanent magnetic type and has a flux associated therewith which interacts with the field generated by the stator windings to cause rotation of the rotor 177.

One lead of each stator winding labeled the A coil, the B coil, and the C coil is available for connection to a motor power supply. The other lead of each of these stator windings is connected to a common ground point indicated at 178.

Referring to FIG. 13, a sequence of power pulses for operating the motor shown schematically in FIG. 12 is shown. According to this sequence, current conducts in two stator windings at all times, providing there is no pulse shortening due to the action of a commutation circuit and a pulse centering circuit. Specifically, the sequence of applying power for sustaining rotary motion in one direction for a three phase/four wire machine is as follows: −B +C, +A −B, +A −C, +B −C, −A +B, and −A +C. By reversing this sequence, the machine can be made to rotate in the opposite direction.

Referring to FIG. 13, the zero crossings of the induced voltage in the stator windings, for the machine shown in FIG. 12 wherein the rotor is there shown at its 90° position while rotating in a clockwise direction, occur when the rotor is positioned at 0°, 60°, 120°, 180°, 240°, 300° and 360°. As can be seen from the signals representing when power is applied to the A, B, and C coils, these zero crossover points occur at a time displaced by the time required for the rotor to rotate 60°. Therefore, a counter arrangement like that described in connection with FIG. 4 can also be utilized in three phase machines to determine the position of the rotor.

In order to permit a two counter system of the type shown in FIG. 4 to generate position signals for a machine of the type shown in FIG. 12, a small circuit modification like that shown in FIG. 14 is necessary. Each of the stator windings in a three phase machine has associated therewith a zero crossing detector of the type shown in FIG. 4. The output wire of each of these zero crossing detectors produces a pulse whenever a zero crossing is detected for the induced voltage in the stator winding connected thereto. The zero crossing signals are presented to one input of an OR gate 180, as shown in FIG. 14. The output of this OR gate 180 is connected to one input of two AND gates 181 and 182. The second input to the AND gate 181 is connected directly to the output of a flip-flop 183 while the second input of the AND gate 182 is connected to the output of an inverter circuit 184 whose input is connected directly to the output of the flip-flop 183. Consequently, the second input to the AND gate 181 will always have a signal applied thereto having a logic level opposite that of the second input to the AND gate 182. Thus, a pulse generated at the output of the OR gate 180 indicating the detection of a zero crossing of induced voltage in one stator winding will pass through either the AND gate 181 or the AND gate 182 but not both. The output of the AND gate 181 is connected into the circuit of FIG. 4 and corresponds to the input wire 116 to the commutation circuit 17. The output of the AND gate 182, on the other hand, corresponds to the input wire 122 to the commutation circuit 17. The signals on these wires 116 and 122 serve the same identical functions as previously described.

Each output of the AND gates 181, 182 are connected to one input of another OR gate 185. The output of this OR gate 185 is connected to the input of a delay line or similar delaying circuit 186 whose output appears at a time delayed from the time when the input is applied thereto. This delay 186 is connected to the input of the flip-flop 183. As such, each time a zero crossing is detected, this zero crossing detection is operational to generate a pulse on either wire 116 or 122. This pulse is also operational to change the state of the flip-flop 183 so that a subsequent zero crossing detected will reverse the line 116 or 122 on which the pulse appears. Therefore, subsequent zero crossings detected by the zero crossing detectors are operational to alternately generate pulses on the wires 116 and 122. These alternate pulses are utilized in a manner as described earlier in connection with the counters 18 and 19 of FIG. 4.

In addition to the modifications shown in FIG. 14, the electronic stepping switch 14 of FIG. 4 must be modified to generate six unique output signals in sequence in response to the input pulses from a start circuit or a commutation circuit rather than the four shown for the circuit in FIG. 4. The motor power supply 13 in FIG. 4 must also be modified to utilize these six output signals to generate six power pulses according to the sequence described above in connection with the motor shown generally in FIG. 12. Additionally, the plugging circuit 9 of FIG. 4 must be expanded to include six AND gate/latch tandems rather than four so as to sense during each rotor rotation premature occurrence of any of the six zero crossings of voltage induced across the stator windings. The outputs of the six latches connect along with the six outputs of the modified electronic stepping switch through six OR gates to the six inputs of the modified motor power supply. This will assure that the three phase motor in FIG. 12 will be synchronized at the selectable speed established by a rate variable oscillator whose frequency is such that six evenly spaced pulses are generated during the period of time the rotor completes one turn at the selected speed of rotation.

Modification of the zero crossing detectors may also be necessary in a machine having three or more phases, especially where the machine is operated over a wide range of loads and/or synchronous speeds or, if synchronous operation is not desired, the speed is allowed to vary with change in load. This is in consequence of transformer action occurring in machines having three or more phases since such machines have stator windings that are physically oriented with respect to each other at an angle different than 90°. The three phase machine in FIG. 12, for example, has stator windings oriented with respect to each other an an angle of 120°.

When the voltage across a stator winding changes, the magnetic field in the stator winding changes. Since the stator windings in a three or more phase machine are oriented with respect to each other at an angle different than 90°, the changing magnetic field produces a voltage by transformer action across other stator windings. Changes in voltage across a stator winding are primarily due to switching transients occurring when voltage is applied to or removed from the stator winding, although changes in voltage across a stator winding are also influenced by voltages induced across the stator windings by the rotating rotor magnetic field and the interaction of the induced voltages with the voltage that is applied to powered stator windings.

The characteristic of the voltage induced by transformer action depends on the load and machine speed. If the machine is maintained at a selectable speed when the load changes, the duration and/or amplitude of voltage pulses which are applied to the stator windings is adjusted to maintain the selectable speed. This affects the characteristic of the voltage due to transformer coupling among the stator windings. If the machine speed is allowed to vary with change in load, that is, the curve to the right of $T_m$ in FIG. 3 characterizes machine operation, the duration and/or amplitude of voltage pulses which are applied to the stator windings is not adjusted, but the machine speed changes. This affects the characteristic of the voltage due to trasformer coupling among the stator windings.

As shown in FIG. 6, if the machine is maintained at a selectable speed when the load changes, the curve +V', 94', 95, 96, 97, 98, 99 represents the voltage across a stator winding at a lesser load. Curve +V, 94, 95, 96', 97', 98', 99 represents the voltage across a stator winding at a greater load if one assumes that the voltage pulse duration is maximum and voltage amplitude control is used to maintain the selectable speed. Although the zero crossing 99 occurs at the same time since the selectable speed is maintained, the zero crossing 97 for operation at the lesser load occurs sooner than the zero crossing 97' for operation at the greater load.

If the machine speed is allowed to vary with change in load, at a higher load, the machine speed is lower, and the curve +V, 94, 95, 96, 97', 98', 99' represents the voltage across a stator winding. At a lower load, the machine speed is higher, and the cruve +V, 94, 95, 96, 97, 98, 99 represents the voltage across a stator winding. The zero crossing 97' for operation at a higher load, or lower speed, occurs later than the zero crossing 97 for operation at a lower load, or higher speed.

As shown in FIG. 6, the time during which the voltage across the stator winding passes through the range between −V volts and zero volts varies with change in load and/or machine speed. The exact time at which the voltage crosses through zero volts, such as at 97 or 97', can vary significantly in a machine with three or more phases, especially where the machine is operated over a wide range of loads and/or synchronous speeds or, if synchronous operation is not desired, the speed is allowed to vary with change in load. Consequently, modifying the period of the delay 105 in FIG. 4 might not accomplish the desired objective of indicating only zero crossings of voltage induced across a stator winding, such as at 99 or 99', if the three or more phase machine is operated at different loads and/or speeds. That is, if the machine is maintained at a selectable speed when the load changes, a delay 105 which would have a period sufficient to cause the zero crossing 97' to be ignored when the load was high might be sufficient to cause the zero crossing 99 to be ignored when the load was low. Similarly, if the machine speed is allowed to vary with change in load, a delay 105 which would have a period sufficient to cause the zero crossing 97' to be ignored at low speed might be sufficient to cause the zero crossing 99 to be ignored at high speed.

With reference to FIG. 6, the slope of the voltage is positive at zero crossings 97 and 97'. The slope of the voltage is negative at zero crossings 99 and 99'. In accordance with the present invention, indication of only zero crossings 99 or 99' of the voltage induced across the stator windings by the rotating rotor magnetic field is achieved by modification of the zero crossing detectors to include slope sensors.

Figure 18:
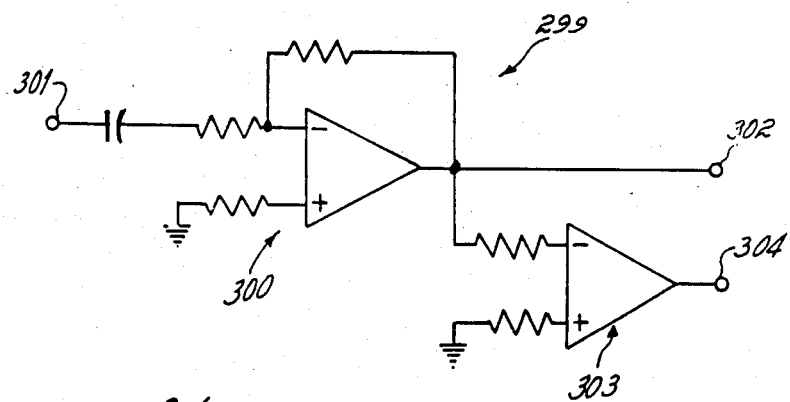
FIG. 18 is a circuit diagram for a slope sensor.

A slope sensor 299 is shown in FIG. 18. The slope sensor 299 includes a differentiator 300. The inverting input of an ideal differential amplifier is connected through an input resistor and a capacitor to a stator winding at input terminal 301. The non-inverting input is connected through a resistor to ground. The differentiator 300 also includes a negative feedback resistor.

The voltage at the output terminal 302 of the differentiator 300 will be negative when a positive going voltage appears across a stator winding and positive when a negative going voltage appears across a stator winding.

The output terminal 302 of the differentiator 300 is also connected through an input resistor to the inverting input of an ideal differential amplifier 303 which functions as an inverter. The non-inverting input of the inverter 303 is connected through a resistor to ground. The voltage at the output terminal 304 of the inverter 303 will be positive when a positive going voltage appears across a stator winding and negative when a negative going voltage appears across a stator winding.

In a three-or-more phase machine, the zero crossing detector for each stator winding is modified to include a slope sensor 299 such as shown in FIG. 18. By way of example, and with reference jointly to FIGS. 4 and 18, the input terminal 301 is connected to a stator winding, such as at terminal 89. The output terminal 304 is connected to the input and an AND gate corresponding to the AND gate 111. The output terminal 302 is connected to the input of an AND gate corresponding to the AND gate 112. Slope sensors are similarly connected in the zero crossing detectors for the other stator windings.

The modified zero crossing detectors operate to produce an indication only when a zero crossing of the voltage induced across a stator winding by the rotating rotor magnetic field occurs. By way of example, suppose the voltage in FIG. 6 appears across the A coil in a three phase machine. If the zero crossing detector were modified as described above, the output of the AND gate 112 is positive whenever the voltage induced across the A coil is negative, the signal on the wire 59 is positive indicating that a positive power pulse is being applied to the B coil, the induced voltage in the A coil has been greater than −V volts for the period of the delay 105, and the output terminal 302 of the slope sensor 299 in FIG. 18 is positive indicating that the induced voltage in the A coil is negative going. This condition occurs just after the induced voltage across the A coil goes through zero volts at 99 or 99' in FIG. 6. This would correspond to the zero crossing of the voltage induced across the A coil occurring at 180° in FIG. 13.

The delay 105 is included in the zero crossing detector to prevent a positive output from the delay line 104 during the time that the voltage in FIG. 6 crosses through zero volts at 95 and the time that the voltage crosses through −V volts going toward −4 V volts. This prevents indication of the zero crossing 95. The slope sensor 299 then prevents indication of the zero crossing at 97 or 97'. Consequently, only the zero crossing 99 or 99' is indicated. The addition of the slope sensor to the zero crossing detectors for the stator windings of a machine having three or more phases makes possible indication of only zero crossing 99 or 99' no matter what the machine speed is.

When a machine having three or more phases is operated in a reverse direction, the connection of the output terminals 302 and 304 of the slope sensors must be switched. That is, the output terminal 304 must be connected to the input of the AND gate to which the output terminal 302 was connected and vice versa in each zero crossing detector when the mode of operation is changed from forward to reverse.

It will be recognized by those skilled in the machine art that the techniques of pulse widening and shortening described in connection with FIG. 4 are equally operative in connection with machines of the type shown in FIG. 12. The principles of the invention may also be applied in the operation of three phase/three wire motors.

Referring again to FIG. 13 it is possible to structure an Up/Down counter arrangement so that there is a pair of counters associated with each of the stator windings. The A counters, B counters, and C counters are easily activated in response to zero crossings detected for the induced voltage in the A coil, B coil, and C coil so that a timing sequence, like that shown in FIG. 13, can be generated. This timing sequence will generate borrow or second position pulses from either the A, B or C counter at times when the rotor is at a known position. The advantage achieved by having pairs of counters associated with each stator winding is that it is possible, with this configuration, to power the stator windings for a different length of time than that shown for the power pulses in FIG. 13, thus permitting the machine performance to be selectively modified.

It will be clear to those of skill in the art that the principles of the invention as outlined above in connection with two phase and three phase machines may easily be extended to machines having any number of phases. Indeed, any machine of the type herein described with any number of phases and any number of poles can be operated in accordance with the principles of this invention.

It will be readily recognized by those of skill in the art that the foregoing description has been made with particular emphasis on a preferred implementation shown in the drawings. The specific implementation shown in the drawings however, is merely representative of a preferred implementation for the functions described. This description is not, however, intended to be exemplary of every possible logic configuration for performing the functions defined. Indeed, many circuit modifications may be made to the specific configuration shown in FIGS. 7–11 while still maintaining the same function as described in connection with FIG. 4. Further, those skilled in the art will readily recognize that the described functions and their equivalents can be implemented in MOS technology which is advantageous because assembly costs can be dramatically reduced. It will also be recognized by those skilled in the art that these and other modifications in form only may be made without departing from the spirit and scope of this invention as defined more particularly by the following claims.

Instead of hard wired logic as illustrated herein, the motor can also be computer controlled as, for example, by the use of microprocessors which are programmed to perform the basic functions described herein.

What is claimed is:

1. A brushless dc motor coupled to a load and to a source of electrical power comprising, in combination:
    a stator with a plurality of windings thereon, each said stator winding producing a flux when electrical current flows therethrough;
    a rotor, rotatably mounted with respect to said stator, one of said stator and rotor being coupled to the load;
    means for producing a magnetic field in said rotor which is fixedly oriented with respect to said rotor, said field interacting with said flux to produce a rotational torque force on said rotor when the physical positioning of said rotor with respect to conducting stator windings is such that the torque angle is greater than 0°, said magnetic field of said stator windings when said rotor is rotating;
    power signal generating means, coupled to the source of electrical power and responsive to said induced voltage in said stator windings, for applying power signals to said stator windings in a predetermined sequence, said power signals being applied at times always symmetric about the time when said torque angle is a predetermined value over a range of loads and over a range of power source variations.

2. A brushless dc motor coupled to a load and to a source of electrical power comprising, in combination:
    a stator with a plurality of windings thereon, each said stator winding producing a flux when electrical current flow therethrough;
    a rotor, rotatably mounted with respect to said stator, one of said stator and rotor being coupled to the load;
    means for producing a magnetic field in said rotor which is fixedly oriented with respect to said rotor, said field interacting with said flux to produce a rotational torque force on said rotor when the physical positioning of said rotor with respect to conducting stator windings is such that the torque angle is greater than 0°;
    rotor position sensing means responsive to induced voltages in said stator windings for generating a position signal at times when the rotor has a known positional relationship with respect to a conducting stator winding; and
    power signal generating means, coupled to the source of electrical power and responsive to said position signal, for applying power signals to said stator windings in a predetermined sequence, said power signals being applied at times always symmetric about the time when said torque angle is a predetermined value over a range of loads and over a range of power source variations.

3. The method of commutating the windings of a stator of a brushless dc motor, coupled to a load and to a source of electrical power, having a rotor having a fixedly oriented magnetic field with respect to said rotor, comprising the steps of:
    detecting the back emf of a stator winding to determine at least one known angular position of the rotor;
    determining a required operating angular position by using said known angular position; and
    applying a voltage to said winding over a period which is symmetrical about said operating angular position, over a range of loads and over a range of power source variations, said operating angular position being spaced from said known angular position by a preselected angle.

4. The method of commutating the windings of a stator of a motor having a rotor having a fixedly oriented magnetic field with respect to said rotor, comprising the steps of:
    detecting the back emf of a stator winding to determine at least one known angular position of the rotor;
    determining a required operating angular position by using said known angular position, wherein said known angular position is the zero crossing of said back emf and wherein said operating angular position is spaced from said known position by 90°; and applying a voltage to said winding over a period which is symmetrical about said operating angular position, said operating angular position being spaced from said known angular position by a preselected angle.

5. The method of commutating the windings of a stator of a motor having a rotor having a fixedly oriented magnetic field with respect to said rotor, comprising the steps of:
- detecting the back emf of a stator winding to determine at least one known angular position of the rotor;
- determining a required operating angular position by using said known angular position;
- applying a voltage to said winding over a period which is symmetrical about said operating angular position, said operating angular position being spaced from said known angular position by a preselected angle;
- detecting two consecutive zero crossings of back emf;
- measuring the interval of time between said zero crossings, said interval of time being inversely proportional to the speed of said rotor; and
- determining from the known speed of the rotor the time for the rotor to reach any angular position.

6. The method of commutating the windings of a stator of a motor having a rotor having a fixedly oriented magnetic field with respect to said rotor, comprising the steps of:
- detecting the back emf of a stator winding to determine at least one known angular position of the rotor;
- determining a required operating angular position by using said known angular position;
- applying a voltage to said winding over a period which is symmetrical about said operating angular position, said operating angular position being spaced from said known angular position by a preselected angle;
- detecting two consecutive zero crossings of back emf;
- measuring the interval of time between said zero crossings, said interval of time being inversely proportional to the speed of said rotor; and
- determining from the known speed of the rotor the time for the rotor to reach the operating angular position.

7. The method of commutating the windings of a stator of a motor having a rotor having a fixedly oriented magnetic field with respect to said rotor, comprising the steps of:
- detecting the back emf of a stator winding to determine at least one known angular position of the rotor;
- determining a required operating angular position by using said known angular position;
- applying a voltage to said winding over a period which is symmetrical about said operating angular position, said operating angular position being spaced from said known angular position by a preselected angle;
- counting the pulses at a predetermined frequency between two zero crossings to determine the interval of time between said zero crossings, said interval of time being inversely proportional to the speed of the rotor; and
- counting said pulses from said zero crossing at a predetermined ratio of said frequency to locate said operating angular position.

8. In a brushless dc motor with a stator having a plurality of windings thereon, each stator winding producing a flux when electrical current flows therethrough, a rotor rotatably mounted with respect to the stator, and a field producing means in the rotor to produce a field fixedly oriented with respect to said rotor, the field being operative to induce a voltage in the stator windings when the rotor is rotating, the method of applying power pulses to the stator windings comprising the steps of:
- applying, responsive to the induced voltage in the stator windings, power pulses of a selected polarity to each of the stator windings in a repetitive sequence at times symmetric about the time when the torque angle between the rotor and a stator winding to which one of said power pulses is applied is a predetermined value;
- adjusting the width of said selected polarity power pulses while maintaining said symmetry to compensate for speed variations within a predetermined range; and
- applying power pulses of a reversed polarity to at least one of the stator windings to compensate for speed variations beyond said predetermined range, when the width of said selected polarity power pulses has been reduced to a minimum value.

9. In a brushless dc motor with a stator having a plurality of windings thereon, each stator winding producing a flux when electrical current flows therethrough, a rotor rotatably mounted with respect to the stator, and a field producing means in the rotor to produce a field fixedly oriented with respect to said rotor, the field being operative to induce a voltage in the stator windings when the rotor is rotating, a power circuit for applying power pulses to the stator windings, comprising, in combination:
- power pulse generating means, responsive to the induced voltage in the stator windings, for producing power pulses and for applying said power pulses at a selected polarity to each of the stator windings in a predetermined sequence at times symmetric about the time when the torque angle between the rotor and a stator winding to which a power pulse is applied is a predetermined value, in a predetermined sequence;
- a speed control circuit to generate pulse width control signals, said power pulse generating means responding to said pulse width control signals to establish the width of said selected polarity power pulses applied to the stator windings, the lengthening or shortening of the width of power pulses maintaining said symmetry and being operative to compensate for speed variations within a predetermined range; and
- plugging control circuit means, responsive to the pulse width control circuit, for applying power pulses of a reversed polarity to at least one of the stator windings to compensate for speed increases beyond said predetermined range, when the width of said selected polarity power pulses has been reduced to a minimum value.

* * * * *